United States Patent Office 3,801,589

Patented Apr. 2, 1974

3,801,589

1,3,4-THIADIAZOL-5-ONE-YL-UREAS

Klaus Sasse and Ludwig Eue, Cologne-Stammheim, and Helmuth Hack, Cologne-Buchheim, Germany, assignors to Bayer Aktiengesellschaft, Leverkusen, Germany No Drawing. Continuation-in-part of application Ser. No. 204,307, Dec. 2, 1971, which is a continuation-in-part of applications Ser. No. 817,417, Apr. 17, 1969, and Ser. No. 16,937, Mar. 5, 1970, all now abandoned. This application Feb. 8, 1972, Ser. No. 224,626

Claims priority, application Germany, Apr. 19, 1968, P 17 70 236.2; Mar. 22, 1969, P 19 14 629.3

Int. Cl. C07d *91/62*

U.S. Cl. 260—306.8 D 5 Claims

ABSTRACT OF THE DISCLOSURE 1,3,4 - thiadiazol-5-one-2-yl-ureas, i.e. 1-[4'-(optionally alkyl, alkoxy-alkyl, cycloalkyl, alkyl-cycloalkyl, cycloalkenyl, tetrahydronaphthyl, fluorenyl, phenyl-alkyl, naphthyl-alkyl, diphenyl-methyl, triphenyl-methyl, chlorobenzyl, alkyl-phenyl-alkyl, alkoxy-benzyl, nitro-benzyl, cyanobenzyl, trifluoromethyl-benzyl, dialkyl-amino-benzyl, phenyl, naphthyl, halo-phenyl, alkyl-phenyl, nitro-phenyl, cyano-phenyl, trifluoromethyl-phenyl, alkyl-chlorophenyl, trifluoromethyl-chloro-phenyl, and furfuryl substituted)-1',3',4'-thiadiazol-5'-one-2'-yl]-1-[optionally alkyl, alkenyl and alkoxy-alkyl substituted]-3-[optionally alkyl and alkenyl substituted]-3-[aliphatic and alkoxy]-ureas as well as the thione and thiourea analogues thereof which possess herbicidal properties, and which may be produced by conventional methods.

This application is a continuation-in-part of application Ser. No. 204,307, filed Dec. 2, 1971, now abandoned, which in turn is a continuation-in-part of application Ser. No. 817,147, filed Apr. 17, 1960, now abandoned; it is also a continuation-in-part of application Ser. No. 16,937, filed Mar. 5, 1970, now abandoned.

The present invention relates to and has for its objects the provision of particular new 1,3,4-thiadiazol-5-one-2-yl-ureas, i.e. 1-[4'-(optionally alkyl, alkoxy-alkyl, cycloalkyl, alkyl-cycloalkyl, cycloalkenyl, tetrahydronaphthyl, fluoroenyl, phenyl-alkyl, naphthyl-alkyl, diphenyl-methyl, triphenyl-methyl, chloro-benzyl, alkyl-phenyl-alkyl, alkoxy-benzyl, nitro-benzyl, cyano-benzyl, trifluoro-methyl-benzyl, dialkyl-amino-benzyl, phenyl, naphthyl, halophenyl, alkyl-phenyl, nitro-phenyl, cyano-phenyl, trifluoromethyl-phenyl, alkyl-chloro-phenyl, trifluoromethyl-chloro-phenyl, and furfuryl substituted)-1',3',4'-thiadiazol-5'-one-2'-yl]-1-[optionally alkyl, alkenyl and alkoxy-alkyl substituted]-3-[optionally alkyl and alkenyl substituted]-3-[aliphatic and alkoxy]-ureas as well as the thione and thiourea analogues thereof, which possess valuable, especially selective, herbicidal properties, active compositions in the form of mixtures of such compounds with solid and liquid dispersible carrier vehicles, and methods for producing such compounds and for using such compounds in a new way, especially for combating weeds, undesired plants, and the like, with other and further objects becoming apparent from a study of the within specification and accompanying examples.

It is already known that 1,3-thiazol-2-yl-ureas, for example 1 - [5' - methyl - 1',3'-thiazol-2'-yl]-3-methyl-urea (A), can be used as herbicidally active compounds (compare Belgian Pat. 679,138).

It has now been found, in accordance with the present invention, that the particular new 1,3,4 - thiadiazolonylureas of the formula

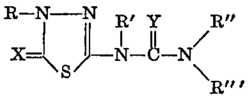

(I)

in which

R is

- hydrogen;
- alkyl of 1–13 carbon atoms;
- alkoxy-alkyl having 1–4 carbon atoms in the alkoxy moiety and 1–4 carbon atoms in the alkyl moiety;
- cycloalkyl of 3–12 ring carbon atoms;
- alkyl-cycloalkyl having 1–4 carbon atoms in the alkyl moiety and 5–5 ring carbon atoms in the cycloalkyl moiety;
- cycloalkenyl;
- tetrahydronaphthyl;
- fluorenyl;
- phenyl-alkyl having 1–4 carbon atoms in the alkyl moiety;
- naphthyl-alkyl having 1–4 carbon atoms in the alkyl moiety;
- diphenyl-methyl;
- triphenyl-methyl;
- chloro-substituted benzyl;
- alkyl-phenyl-alkyl having 1–4 carbon atoms in each corresponding alkyl moiety;
- alkoxy-benzyl having 1–4 carbon atoms in the alkoxy moiety;
- nitro-benzyl;
- cyano-benzyl;
- trifluoromethyl-benzyl;
- dialkyl-amino-benzyl having 1–4 carbon atoms in each alkyl moiety;
- phenyl;
- naphthyl;
- halo-substituted phenyl;
- alkyl-phenyl having 1–4 carbon atoms in the alkyl moiety;
- nitro-phenyl;
- cyano-phenyl;
- trifluoromethyl-phenyl;
- alkyl-chloro-phenyl having 1–4 carbon atoms in the alkyl moiety;
- trifluoromethyl-chloro-phenyl; and
- furfuryl;

R' is

- hydrogen;
- alkyl of 1–4 carbon atoms;
- alkenyl of 2–4 carbon atoms; and
- alkoxy-alkyl having 1–4 carbon atoms in the alkoxy moiety and 1–4 carbon atoms in the alkyl moiety;

R'' is

- hydrogen;
- alkyl of 1–3 carbon atoms; and
- alkenyl of 2–3 carbon atoms; and

R''' is

- aliphatic of 1–4 carbon atoms; and
- alkoxy of 1–4 carbon atoms; and

X and Y are oxygen or sulfur, exhibit strong herbicidal, in particular selective herbicidal, properties.

It has been furthermore found, in accordance with the present invention, that processes for the particular new compounds of Formula I above may be provided, which comprise:

[a] Reacting a carbamic acid halide of the formula

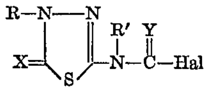
(II)

in which R and R′ are the same as defined above, and Hal is chlorine or bromine with an amine of the formula

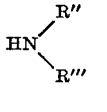
(III)

in which
R″ and R‴ are the same as defined above,
or

[b] Reacting a 2-amino-1,3,4-thiadiazol-5-one of the formula

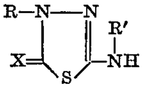
(IV)

in which R and R′ are the same as defined above with an isocyanate or thioisocyanate of the formula

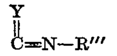
(V)

in which R‴ is the same as defined above.

Surprisingly, the ureas of Formula I above, show considerably stronger and more selective herbicidal properties than those previously known ureas which are the chemically closest active compounds of the same kind of activity. The active compounds according to the present invention therefore represent a valuable enrichment of the art.

Advantageously, in accordance with the present invention, in the various formulae herein:

R represents hydrogen;

alkyl hydrocarbon of 1–13 carbon atoms such as methyl, ethyl, n- and iso-propyl, n-, iso-, sec.- and tert.-butyl, amyl, iso-amyl, hexyl, iso-hexyl (5-methyl-pentyl), 1,2,2-trimethyl-propyl, heptyl, 1-n-propyl-butyl, octyl, 2-ethyl-hexyl, nonyl, decyl, undecyl, dodecyl, tridecyl, 1-methyl-dodecyl, and the like, i.e. $C_{1-13}$ alkyl, especially $C_{1-8}$ $C_{1-6}$ or $C_{1-14}$ alkyl;

alkoxy-alkyl having 1–4 carbon atoms in the alkoxy moiety and 1–4 carbon atoms in the alkyl moiety such as methoxy, ethoxy, n- and iso-propoxy, n-, iso-, sec.- and tert.-butoxy-, and the like, -methyl, ethyl, n- and isopropyl, n-, iso-, sec.- and tert.-butyl, and the like, i.e. $C_{1-4}$ alkoxy-$C_{1-4}$ alkyl, especially $C_{1-4}$ alkoxy-$C_{1-2}$ alkyl;

cycloalkyl of 3–12 ring carbon atoms such as cyclo-propyl, pentyl, -hexyl, -heptyl, -octyl, -nonyl, -decyl, -undecyl, -dodecyl, and the like, i.e. $C_{3-12}$ cycloalkyl, especially $C_{5-12}$ or $C_{5-6}$ cycloalkyl, i.e. cyclopropyl and cyclohexyl;

alkyl-cycloalkyl having 1–4 carbon atoms in the alkyl moiety and 5–6 ring carbon atoms in the cycloalkyl moiety such as methyl to tert.-butyl- inclusive as defined above, and the like, -cyclopentyl, cyclohexyl, and the like, i.e. 2-, 3- and 4- ($C_{1-4}$ alkyl)- $C_{5-6}$ cycloalkyl, especially $C_{1-2}$ alkyl- $C_{5-6}$ cycloalkyl, and more especially 3- or 4-($C_{1-4}$ or $C_{1-2}$ alkyl)- $C_{5-6}$ cycloalkyl e.g. cyclohexyl);

cycloalkenyl such as cyclohexenyl, and the like;

tri alkyl-cyclohexenyl having 1–2 carbon atoms in each alkyl moiety such as 2,3,4-, 2,3,5-, 2,3,6-, 2,4,5-, 2,4,6- and 3,4,5-tri (same and mixed) methyl ethyl, and the like, -cyclohex-1,2 and 3-enyl, i.e. -tri $C_{1-2}$ alkyl-cyclohexenyl, especially 3,4,5-tri $C_{1-2}$ alkyl-cyclohexenyl, more especially 3,4,5-tri $C_{1-2}$ alkyl-cyclohex-1,2 and 3-enyl, and most especially 3,4,5-trimethyl-cyclohex-2-enyl;

tetrahydronaphthyl such as 1,2,3,4-tetrahydronaphthyl, and the like;

fluorenyl;

phenyl-alkyl having 1–4 carbon atoms in the alkyl moiety such as phenyl- -methyl to tert-butyl inclusive as defined above, and the like, i.e. phenyl-$C_{1-4}$ alkyl, including benzyl, phenyl- -eth-1 and 2-yl, prop-1,2 and 3-yl, but-1,2,3 and 4-yl, and the like, especially phenyl-$C_{1-3}$ or $C_{1-2}$ alkyl;

naphthyl-alkyl having 1–4 carbon atoms in the alkyl moiety such as naphthyl- -methyl to tert.-butyl inclusive as defined above, and the like, i.e. naphthyl-$C_{1-4}$ alkyl, including $\alpha$- and $\beta$-naphthyl- -methyl, eth-1 and 2-yl, prop-1,2 and 3-yl, but-1,2,3 and 4-yl, and the like, especially $\alpha$- and $\beta$-naphthyl-$C_{1-3}$ or $C_{1-2}$ alkyl;

diphenyl-methyl;

triphenyl-methyl;

chloro-substituted benzyl such as mono to tri chloro substituted benzyl, including 2-, 2- and 4-mono, 2,3-, 2,4- 2,5-, 2,6-, 3,4- and 3,5-di, and 2,3,4-, 2,3,5-, 2,3,6-, 2,4,5-, 2,4,6- and 3,4,5- tri chloro substituted benzyl, especially 4-chloro, 2,4-dichloro and 2,4,5-trichloro substituted benzyl, and the like;

alkyl-phenyl-alkyl having 1–4 carbon atoms in each alkyl moiety such as methyl to tert.-butyl inclusive as defined above, and the like, -phenyl- -methyl to tert.-butyl inclusive as defined above, and the like, i.e. 2-, 3- and 4-($C_{1-4}$ alkyl)-phenyl-$C_{1-4}$ alkyl, especially 4-($C_{1-4}$ alkyl)-phenyl-$C_{1-4}$ or $C_{1-2}$ alkyl;

alkoxy-benzyl having 1–4 carbon atoms in the alkoxy moiety such as methoxy to tert.-butoxy inclusive as defined above, and the like, -benzyl, i.e. 2-, 3- and 4-($C_{1-4}$ alkoxy)-benzyl, especially 4-($C_{1-4}$ or $C_{1-2}$ alkoxy)-benzyl, and the like;

nitro-benzyl such as 2-, 3- and 4-nitro-benzyl, especially 3-nitro-benzyl;

cyano-benzyl such as 2-, 3- and 4-cyano-benzyl, especially 4-cyano-benzyl;

trifluoromethyl-benzyl such as 2-, 3- and 4-trifluoromethyl-benzyl, especially 4-trifluoromethyl-benzyl;

dialkyl-amino-benzyl having 1–4 carbon atoms in each alkyl moiety such as di (same and mixed) methyl to tert.-butyl inclusive as defined above, and the like, -amino-benzyl, i.e. di-$C_{1-4}$ alkyl-amino-benzyl, especially 2-, 3- and 4-(di-$C_{1-4}$ or $C_{1-2}$ alkyl)-amino-benzyl, and more especially 4-(di-$C_{1-4}$ or $C_{1-2}$ alkyl, preferably methyl)-amino-benzyl;

phenyl;

naphthyl such as $\alpha$- and $\beta$-naphthyl, and the like;

halo-substituted phenyl such as 2-, 3- and 4-mono and 2,3-, 2,4-, 2,5-, 2,6-, 3,4- and 3,5- di (same and mixed) chloro, bromo, iodo and fluoro- -phenyl, and the like, especially mono and di chloro-phenyl, bromo-phenyl, iodo-phenyl and fluorophenyl, and more especially 2-, 3- and 4-chloro-phenyl, 4-bromo-phenyl, 4-iodo-phenyl, 4-fluoro-phenyl, and the like;

alkyl-phenyl having 1–4 carbon atoms in the alkyl moiety such as methyl to tert.-butyl inclusive as defined above, and the like, -phenyl, i.e. 2-, 3- and 4-($C_{1-4}$ alkyl)-phenyl, especially $C_{1-2}$ alkyl-phenyl, more especially methyl-phenyl, and most especially 4-methyl-phenyl;

nitro-phenyl such as 2-, 3- and 4-nitro-phenyl, especially 2-nitro-phenyl;

cyano-phenyl such as 2-, 3- and 4-cyano-phenyl, especially 4-cyano-phenyl;

trifluoromethyl-phenyl such as 2-, 3- and 4-trifluoro-methyl-phenyl, especially 4-trifluoromethyl-phenyl;

alkyl-chloro-phenyl having 1–4 carbon atoms in the alkyl moiety such as methyl to tert.-butyl inclusive as defined above, and the like, -chloro-phenyl, i.e. $C_{1-4}$ alkyl-chloro-phenyl, including 2-($C_{1-4}$ or $C_{1-2}$ alkyl)-3,4,5 and 6-chloro-phenyl, 2-chloro-3,4,5 and 6-($C_{1-4}$ or $C_{1-2}$ alkyl)-phenyl, 3-($C_{1-4}$ or $C_{1-2}$ alkyl)- 4 and 5-chloro-phenyl, and 3-chloro-4 and 5-($C_{1-4}$ or $C_{1-2}$ alkyl)-phenyl, especially 3-chloro - 4 - ($C_{1-2}$ alkyl)-phenyl, and more especially 3-chloro-4-methyl-phenyl, and the like;

trifluoromethyl-chloro-phenyl such as 2-trifluoromethyl-3,4,5 and 6-chloro-phenyl, 2-chloro-3,4,5 and 6-trifluoromethyl-phenyl, 3-trifluoromethyl-4 and 5-chloro-phenyl, and 3-chloro-4 and 5-trifluoromethyl-phenyl, especially 2-chloro-4-trifluoromethyl-phenyl, and the like; and furfuryl;

R′ represents hydrogen;

alkyl of 1–4 carbon atoms such as methyl to tert.-butyl inclusive as defined above, and the like, i.e. $C_{1-4}$ alkyl, especially $C_{1-2}$ alkyl;

alkenyl of 2–4 carbon atoms such as vinyl, 2-methyl-vinyl, allyl, but-1,2 and 3-enyl, and the like, i.e. $C_{2-4}$ alkenyl, especially $C_{3-4}$ alkenyl, and more especially $C_3$ alkenyl, i.e. allyl; and alkoxy-alkyl having 1–4 carbon atoms in the alkoxy moiety and 1–4 carbon atoms in the alkyl moiety, such as methoxy to tert.-butoxy inclusive as defined above, and the like, -methyl to tert.-butyl inclusive as defined above, and the like, i.e. $C_{1-4}$ alkoxy-$C_{1-4}$ alkyl, especially $C_{1-4}$ alkoxy-$C_{1-3}$ alkyl, and the like;

R″ represents hydrogen;

alkyl of 1–3 carbon atoms such as methyl, ethyl, n- and iso-propyl, and the like, i.e. $C_{1-3}$ alkyl, especially $C_{1-2}$ alkyl; and alkenyl of 2–3 carbon atoms such as vinyl, prop-1 and -2-enyl, and the like, i.e. $C_{2-3}$ alkenyl, especially $C_3$ alkenyl, and more especially allyl; and R‴ represents aliphatic hydrocarbon of 1–4 carbon atoms including:

- alkyl of 1–4 carbons such as methyl to tert.-butyl inclusive as defined above, and the like, i.e. $C_{1-4}$ alkyl, especially $C_{1-2}$ alkyl;
- alkenyl of 2–4 carbon atoms such as vinyl, prop-1 and -2-enyl, but-1,2 and 3-enyl, and the like, i.e. $C_{2-4}$ alkenyl, especially $C_{3-4}$ alkenyl, more especially $C_3$ alkenyl, and most especially allyl; and
- alkynyl (i.e. alkinyl) of 2–4 carbon atoms such as acetylenyl, prop-1 and 2-ynyl, but-1,2 and 3-ynyl, and the like, i.e. $C_{2-4}$ alkynyl, especially $C_{3-4}$ alkynyl, more especially $C_3$ alkynyl, i.e. propynyl, and most especially prop-2-ynyl; and
- alkoxy of 1–4 carbon atoms such as methoxy to tert.-butoxy inclusive as defined above, and the like, i.e. $C_{1-4}$ alkoxy, and especially $C_{1-2}$ alkoxy.

Preferably, R is $C_{1-4}$ alkyl; or $C_{5-6}$ cycloalkyl, especially cyclohexyl; or phenyl; or chloro-phenyl; especially mono and di chloro-phenyl; or $C_{1-4}$ alkyl-phenyl, especially methyl-phenyl; or chloro-trifluoromethyl-phenyl; R′ is $C_{1-4}$ alkyl, especially $C_{1-2}$ alkyl; R″ is hydrogen; or $C_{1-4}$ alkyl, especially $C_{1-2}$ alkyl; and R‴ is $C_{1-4}$ alkyl, especially $C_{1-2}$ alkyl; or $C_{2-4}$ alkenyl, especially allyl.

The reaction course of the process [a] can be represented as follows when 2-[(N-methyl-N-chlorocarbonyl)-amino]-4-cyclohexyl-1,3,4-thiadiazoline-5-one and methylamine are used as starting materials:

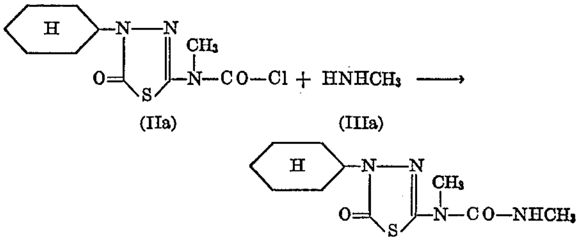

(IIa) (IIIa)

($2_1$)

The course of the reaction of process variant "a" can be represented as follows when the reactants are 2-(N-methyl - N - chlorocarbonylamino) - 4 - isopropyl-1,3,4-thiadiazoline-thione-(5) and methylamine:

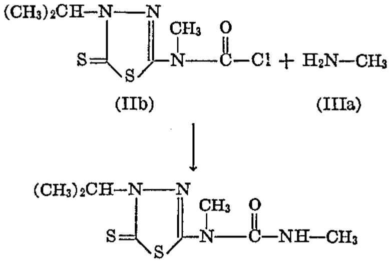

(IIb) (IIIa)

(138)

The starting carbamic acid halides of Formula II above are not yet known. These starting compounds can, however, be prepared in simple manner when the appropriate 1,4-disubstituted thiosemicarbazides are reacted in inert organic solvents, such as hydrocarbons or chlorinated hydrocarbons, with at least 2, preferably 2 to 4, mols of phosgene or thiophosgene per mol of thiosemicarbazide, at a temperature from about —20 to 200° C. (see German patent application F 54 220 IVd/12p; 5. 12.1967). They can also be prepared in simple manner by reacting suitably substituted 2-amino-1,3,4-thiadiazoline-5-(thi)ones in inert organic solvents, such as hydrocarbons or chlorinated hydrocarbons, with at least the equimolar amount of phosgene or thiophosgene at temperatures from about —20° to +200° C.

In the following, four typical examples are given for the preparation of starting carbamic acid chlorides of the Formula II above.

[$a_1$] Preparation of 2-[(N-chlorocarbonyl-N-methyl)-amino]-4-phenyl-1,3,4-thiadiazoline-5-one 181 g. (1 mol) of 1-phenyl-4-methyl-thiosemicarbazide are suspended in 700 ml. of chlorobenzene. Phosgene is gradually introduced at room temperature, the temperature rising to 40 to 45° C. At the same time the suspension initially thickens and then later thins out. After subsidence of the exothermic effect, the mixture is heated by external means in order to maintain a temperature of 40 to 45° C. After about 220 g. of phosgene (2.2 mols) have been introduced, a clear solution has formed. Heating is slowly continued up to 100° C. in a weak stream of phosgene and this temperature is maintained for a further hour. The solution is evaporated in a vacuum. There remains a residue of 2-[(N-chlorocarbonyl-N-methyl)-amino]-4-phenyl-1,3-4-thiadiazoline - 5 - one in practically quantitative yield. Recrystallized from carbon tetrachloride, the purified product is obtained in 82% yield. M.P. 105° C.

[$a_2$] Preparation of 2-[(N-chlorocarbonyl-N-methyl)-amino]-4-propyl-1,3,4-thiadiazoline-5-one 147 g. (1 mol) of 1-propyl-4-methyl-thiosemicarbazide are dissolved in 600 ml. of chloroform. About 220 g. (2.2 mols) of phosgene are introduced at room temperature, the temperature rising to about 40° C. A colorless precipitate which temporarily formed re-dissolves in the further course of the reaction. After subsidence of the exothermic effect, the solution is heated at boiling point for about 1 hour in a weak stream of phosgene and then evaporated in a vacuum. There remains, in practically quantitative yield, a residue which gradually crystallizes and from which 2-[(N-chlorocarbonyl-N-methyl)-amino]-4-propyl-1,3,4-thiadiazoline-5-one is obtained in pure form in 86% yield by recrystallization from ligroin. M.P. 34–36° C.

[$a_3$] Preparation of 2-(N-chlorothiocarbonyl-N-methylamino)-4-phenyl-1,3,4-thiodiazoline-5-one 207 g. (1 mol) of 2-methylamino-4-phenyl-1,3,4-thiadiazoline-5-one are suspended in 600 ml. of chloroform. To this suspension are added dropwise at room temperature 115 g. (1 mol) of thiophosgene. The mixture is gradually heated to the boil and then boiled until hydrogen chloride ceases to escape. After evaporation of the solvent, the above-mentioned compound remains in practically quantitative yield. Recrystallized from cyclohexane it has a melting point of 79° to 80° C.

[$a_4$] Preparation of 2-(N-chlorocarbonyl-N-ethylamino)-4-isopropyl-1,3,4-thiadiazoline-5-thione (A) 2-ethylamino - 4 - isopropyl - 1,3,4 - thiadiazoline-5-thione:

To a suspension of 161 g. (1 mol) of 1-isopropyl-4-ethylthiosemicarbazide in 500 ml. of chloroform 115 g. (1 mol) of thiophosgene are added dropwise at room temperature, with cooling.

After the exothermic reaction has ended, the mixture is gradually heated to the boil and boiled until the color of the thiophosgene has disappeared and hydrogen chloride ceases to escape. Filtration from small amounts of the insoluble constituents is effected and the filtrate is evaporated in vacuo. The residue is recrystallized from cyclohexane and recovered as the 2-ethylamino-4-isopropyl-1,3,4-thiadiazoline-5-thione. Yield: 179 g. (88% of theory); M.P. 84°.

(B) 2-(N-chlorocarbonyl-N-ethylamino)-4-isopropyl-1,3,4-thiadiazoline-5-thione:

Into a solution of 179 g. (0.88 mole) of the preceding product of (A) in 500 ml. of chloroform, 96 g. (0.96 mole) of phosgene are introduced at room temperature, with slight cooling. The mixture is heated to the boil gradually in a weak stream of phosgene, and boiling is effected for a further hour under reflux. The crystals remaining after evaporation of the solvent are recrystallized from cyclohexane. Yield: 210 g. (90%) of theory); M.P. 115–116°.

When carrying out process variant [a], it is preferable to work under the following conditions:

The reaction can be carried out in the presence of a solvent (the term solvent as used herein includes mere diluents). As solvents, all inert organic solvents are suitable, and include: aliphatic and aromatic hydrocarbons, which may be chlorinated, such as benzene, toluene, chlorobenzene, methylene chloride, chloroform and carbon tetrachloride; ketones, such as acetone and cyclohexanone; ethers, such as diethyl ether, dioxan and tetrahydrofuran; and the like; and mixtures of two or more of these solvents. However, the work can also be carried out in aqueous suspensions which either contain only water, water and a water-soluble inert organic solvent, or water and a water-insoluble inert organic solvent.

Acid-binding agents are preferably added in order to bind the halogen hydride which forms. As acid binding agents, the amines used for the reaction may function when double the equimolar amount, with reference to the acid halide, is used. Other acid-binding agents may, however, also be used, for example inorganic bases, such as alkali metal hydroxides and alkaline earth metal hydroxides, alkali metal carbonates and alkaline earth metal carbonates, or organic bases, such as tertiary amines, for example triethylamine, N,N-dimethylaniline and pyridine; and the like.

The reaction temperatures can be varied within a fairly wide range. In general, the reaction is carried out at from substantially between 0 to 100° C., preferably from about 10 to 40° C.

Process variant [a] is preferably carried out using equimolar amounts of the reactants.

The reaction is carried out in the usual manner, as is the working up of the reaction mixture, for example by filtration, concentration and crystallization.

When starting with 2-methylamino-4-phenyl-1,3,4-thiadiazol-5-one and methyl isocyanate, the process variant [b] can be represented as follows:

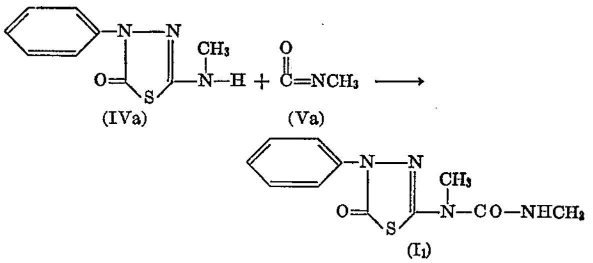

(IVa) (Va)

($I_1$)

The course of the reaction in process variant "b" is illustrated by the following when the reactants are 2-methylamino-4-cyclohexyl - 1,3,4 - thiadiazoline - 5 - thione and methylisocyanate:

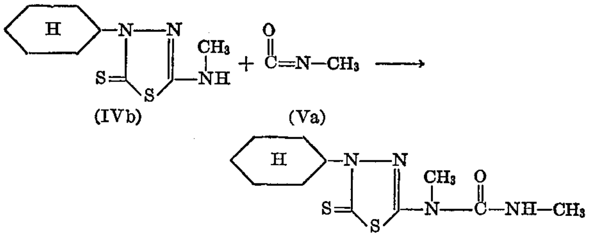

(IVb) (Va)

(140)

Only a few of the starting amino-1,3,4-thiadiazolones of Formula IV above are known. Those starting thiadiazolones which are new can be prepared in an analogous manner to those that are known:

(1) They can be obtained when 1,4-disubstituted thiosemicarbazides are reacted with about equimolar proportions of (thio)phosgene (compare for example Five-Membered Heterocyclic Compounds with Nitrogen and Sulfur or Nitrogen, Sulfur and Oxygen, pages 153–173 (1952), in the series: A. Weissberger, The Chemistry of Heterocyclic Compounds, Interscience Publishers, New York). Preparation of 2-ethylamino-4-isopropyl-1,3,4-thiadiazoline-5-thione proceeds, for example, starting from 1-isopropyl-4-ethylthiosemicarbazide, according to the following:

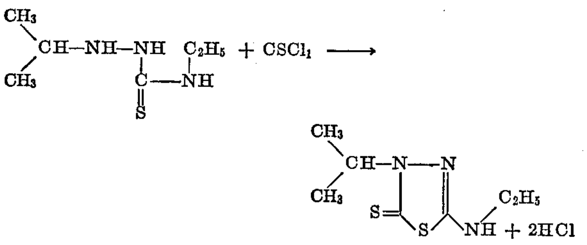

The reaction is preferably carried out in an inert solvent, such as a hydrocarbon, for example, kerosene, benzene, toluene; a chlorinated hydrocarbon, for example, methylene chloride, chloroform, carbon tetrachloride; or an ether such as diethyl ether or glycoldimethyl ether, at a temperature from −10° to 100° C., preferably 0° to 30° C.

(2) (a) The 2-amino-1,3,4-thiadiazol-5-one unsubstituted in 5-position can be prepared by heating 1-carbamoyl-2-thiocarbamoyl-hydrazine in concentrated hydrochloric acid [Chem. Ber. 29, 2506 (1896); J. Ind. Inst. Sci. 16A, 11 (1933); J. Pharm. Soc. Japan 72, 1533 (1952)].

(b) This substance can also be prepared by reaction of 2-thiocarbamoyl-hydrazine-carboxylic acid ethyl ester with acetic anhydride and subsequent acidic splitting up of the acetyl derivative initially formed (compare Soc. 1958, 1508).

(3) A quite general process for the preparation of the 2-amino-1,3,4-thiadiazol-5-ones comprises treating the appropriate 2-halocarbonylamino compounds of Formula II above in the presence of an inert organic solvent, for example acetone, at low temperatures, for example for −10 to 20° C., with aqueous solution of alkali, for example aqueous solution of sodium hydroxide, the chlorocarbonyl radical being split off.

Isolation takes place in the usual manner, for example by neutralization of the reaction mixture and filtering off of the reaction product.

In the following, a typical example is given for the preparation of a starting amino-1,3,4-thiadiazolone of Formula IV above.

[$b_1$] Preparation of 2-allylamino-4-phenyl-1,3,4-thiadiazol-5-one 45 g. 2-[(N-allyl-N-chlorocarbonyl)-amino] - 4 - phenyl-1,3,4-thiadiazol-5-one are dissolved in 250 ml. acetone. A solution of 18 g. sodium hydroxide in 100 ml. of water is added dropwise, with cooling (temperature <20° C.). The mixture is then stirred for 1 hour at room temperature. A further 500 ml. of water are added, and neutralization is effected by the addition of small amounts of hydrochloric acid. The separated reaction product is filtered off with suction, dried, and recrystallized from white spirit. Yield: 30 g.; M.P.: 103–105° C.

The isocyanates of Formula V above are known.

The preferred conditions for the process variant [b] are as follows:

The reaction can be carried out in the presence of a solvent. In this case, the same solvents as suitable for variant [a] as noted above may be used. It is, however, also possible to carry out the reaction in the molten state without diluents or solvents.

The reaction temperature can be varied within a fairly wide range. In general, they are from substantially between about 0 to 150° C.

In order to accelerate the reaction, tertiary amines, such as triethylamine, tributylamine, tri-ethylenediamine, tin (II)octoate, and the like, may be added in small amounts. It is also possible to carry out the reaction from the beginning in a tertiary amine, for example, pyridine.

When carrying out the reaction variant [b], approximately equimolar amounts of the starting materials are preferably used. Working up may take place in the usual manner.

Typical examples of the particular new ureas according to the present invention are mentioned in the following Table A.

TABLE A

| | |
|---|---|
| (105) | 1-[1′,3′,4′-thiadiazol-5′-one-2′-yl]-3-methyl-urea. |
| (106) | 1-[1′,3′,4′-thiadiazol-5′-one-2′-yl]-1,3-dimethyl-urea. |
| (107) | 1-[4′-methyl-1′,3′,4′-thiadiazol-5′-one-2′-yl]-3-methyl-urea. |
| (4) | 1-[4′-methyl-1′,3′,4′-thiadiazol-5′-one-2′-yl]-1,3-dimethyl-urea. |
| (5) | 1-[4′-methyl 1′,3′,4′-thiadiazol-5′-one-2′-yl]-1,3,3-trimethyl-urea. |
| (6) | 1-[4′-ethyl-1′,3′,4′-thiadiazol-5′-one-2′-yl]-1,3-dimethyl-urea. |
| (14) | 1-[4′-butyl-1′,3′,4′-thiadiazol-5′-one-2′-yl]-1,3-dimethyl-urea. |
| (108) | 1-[4′-heptyl-1′,3′,4′-thiadiazol-5′-one-2′-yl]-1,3-dimethyl-urea. |
| (109) | 1-[4′-(1″-propyl-butyl)-1′,3′,4′-thiadiazol-5′-one-2′-yl]-1,3-dimethyl-urea. |
| (87) | 1-[4′-(2″-ethyl-hexyl)-1′,3′,4′-thiadiazol-5-one-2′-yl]-1,3-dimethyl-urea. |
| (110) | 1-[4′-(1″-methyl-dodecyl)-1′,3′,4′-thiadiazol-5′-one-2′-yl]-1,3-dimethyl-urea. |
| (111) | 1-[4′-(2″-butoxy-ethyl)-1′,3′,4′-thiadiazol-5′-one-2′-yl]-1,3-dimethyl-urea. |
| (22) | 1-[4-benzyl-1′,3′,4′-thiadiazol-5′-one-2′-yl]-1,3-dimethyl-urea. |
| (24) | 1-[4′-(4″-chloro-benzyl)-1′,3′,4′-thiadiazol-5′-one-2′-yl]-1,3-dimethyl-urea. |
| (101) | 1-[4′-(4″-methoxy-benzyl)-1′,3′,4′-thiadiazol-5′-one-2′-yl]-1,3-dimethyl-urea. |
| (112) | 1-[4′-(4″-butyl-benzyl)-1′,3′,4′-thiadiazol-5′-one-2′-yl]-1,3-dimethyl-urea. |

TABLE A—Continued

| | |
|---|---|
| (113) | 1-[4′-(2″,4″,5″-trichloro-benzyl)-1′,3′,4′-thiadiazol-5′-one-2′-yl]-1,3-dimethyl-urea. |
| (114) | 1-[4′-(3″-nitro-benzyl)-1′,3′,4′-thiadiazol-5′-one-2′-yl]-1,3-dimethyl-urea. |
| (115) | 1-[4′-(4″-cyano-benzyl)-1′,3′,4′-thiadiazol-5′-one-2′-yl]-1,3-dimethyl-urea. |
| (116) | 1-[4′-(4″-trifluoromethyl-benzyl)-1′,3′,4′-thiadiazol-5′-one-2′-yl]-1,3-dimethyl-urea. |
| (26) | 1-[4′-(1″-phenyl-ethyl)-1′,3′,4′-thiadiazol-5′-one-2′-yl]-1,3-dimethyl-urea. |
| (28) | 1-[4′-diphenylmethyl-1′,3′,4′-thiadiazol-5′-one-2′-yl[-1,3-dimethyl-urea. |
| (117) | 1-[4′-triphenylmethyl-1′,3′,4′-thiadiazol-5′-one-2′-yl]-1,3-dimethyl-urea. |
| (30) | 1-[4′-(2″-[4″′-methyl-phenyl]-ethyl)-1′,3′,4′-thiadiazol-5′-one-2′-yl]-1,3-dimethyl-urea. |
| (32) | 1-[4′-(3″-phenyl-propyl)-1′,3′,4′-thiadiazol-5′-one-2′-yl]-1,3-dimethyl-urea. |
| (118) | 1-[4′-(1″′-[naphth-1″-yl]-ethyl)-1′,3′,4′-thiadiazol-5′-one-2′-yl]-1,3-dimethyl-urea. |
| (34) | 1-[4′-furfuryl-1′,3′,4′-thiadiazol-5′-one-2′-yl]-1,3-dimethyl-urea. |
| (119) | 1-[4′-cyclopropyl-1′,3′,4′-thiadiazol-5′-one-2′-yl]-1,3-dimethyl-urea. |
| (36) | 1-[4′-cyclopentyl-1′,3′,4′-thiadiazol-5′-one-2′-yl]-1,3-dimethyl-urea. |
| (2) | 1-[4′-cyclohexyl-1′,3′,4′-thiadiazol-5′-one-2′-yl]-1,3-dimethyl-urea. |
| (96) | 1-[4′-cyclododecyl-1′,3′,4′-thiadiazol-5′-one-2′-yl]-1,3-dimethyl-urea. |
| (120) | 1-[4′-(4″-methyl-cyclohexyl)-1′,3′,4′-thiadiazol-5′-one-2′-yl]-1,3-dimethyl-urea. |
| (121) | 1-[4′-(3″,4″,5″-trimethyl-cyclohex-2″-ene-yl)-1′,3′,4′-thiadiazol-5′-one-2′-yl]-1,3-dimethyl-urea. |
| (122) | 1-[4′-fluoren-9″-yl-1′,3′,4′-thiadiazol-5′-one-2′-yl]-1,3-dimethyl-urea. |
| (91) | 1-[4′-(1″,2″,3″,4″,-tetrahydronaphth-1″-yl)-1′,3′,4′-thiadiazol-5′-one-2′-yl]-1,3-dimethyl-urea. |
| (1) | 1-[4′-phenyl-1′,3′,4′-thiadiazol-5′-one-2′-yl]-1,3-dimethyl-urea. |
| (45) | 1-[4′-phenyl-1′,3′,4′-thiadiazol-5′-one-2′-yl]-1,3,3-trimethyl-urea. |
| (62) | 1-[4″-chloro-phenyl)-1′,3′,4′-thiadiazol-5′-one-2′-yl]-1,3-dimethyl-urea. |
| (65) | 1-[4′-(4″-chloro-phenyl)-1′,3′,4′-thiadiazol-5′-one-2′-yl]-1-methyl-3-(allyl)-urea. |
| (67) | 1-[4′-(3″,4″-dichloro-phenyl)-1′,3′,4′-thiadiazol-5′-one-2′-yl]-1,3-dimethyl-urea. |
| (123) | 1-[4′-(4″-bromo-phenyl)-1′,3′,4′-thiadiazol-5′-one-2′-yl]-1,3-dimethyl-urea. |
| (124) | 1-[4′-(4″-fluoro-phenyl)-1′,3′,4′-thiadiazol-5′-one-2′-yl]-1,3-dimethyl-urea. |
| (125) | 1-[4′-(4″-iodo-phenyl)-1′,3′,4′-thiadiazol-5′-one-2′-yl]-1,3-dimethyl-urea. |
| (69) | 1-[4′-(4″-methyl-phenyl)-1′,3′,4′-thiadiazol-5′-one-2′-yl]-1,3-dimethyl-urea. |
| (73) | 1-[4′-(4″-trifluoromethyl-phenyl)-1′,3′-4′-thiadiazol-5′-one-2′-yl]-1,3-dimethyl-urea. |
| (74) | 1-[4′-(2″-chloro-4″-trifluoromethyl-phenyl)-1′,3′,4′-thiadiazol-5′-one-2′-yl]-1,3-dimethyl-urea. |
| (76) | 1-[4′-(2″-nitro-phenyl)-1′,3′,4′-thiadiazol-5′-one-2′-yl]-1,3-dimethyl-urea. |
| (126) | 1-[4′-(4″-cyano-phenyl)-1′,3′,4′-thiadiazol-5′-one-2′-yl]-1,3-dimethyl-urea. |
| (127) | 1-[4′-naphth-1″-yl-1′,3′,4′-thiadiazol-5′-one-2′-yl]-1,3-dimethyl-urea. |
| (128) | 1-[4′-naphth-2″-yl-1′,3′,4′-thiadiazol-5′-one-2′-yl]-1,3-dimethyl-urea. |
| (78) | 1-[4′-ethyl-1′,3′,4′-thiadiazol-5′-one-2′-yl]-1-ethyl-3-methyl-urea. |
| (129) | 1-[4′-ethyl-1′,3′,4′-thiadiazol-5′-one-2′-yl]-1-butyl-3-methyl-urea. |
| (130) | 1-[4′-isopropyl-1′,3′,4′-thiadiazol-5′-one-2′-yl]-1-allyl-3-methyl-urea. |
| (131) | 1-[4′-butyl-1′,3′,4′-thiadiazol-5′-one-2′-yl]-1-(2″-methoxy-ethyl)-3-methyl-urea. |
| (132) | 1-[4′-propyl-1′,3′,4′-thiadiazol-5′-one-2′-yl]-1-methyl-3-ethyl-urea. |
| (133) | 1-[4′-propyl-1′,3′,4′-thiadiazol-5′-one-2′-yl]-1-methyl-3-allyl-urea. |
| (134) | 1-[4′-cyclohexyl-1′,3′,4′-thiadiazoline-thione-(5′)-yl](2′)]-1-methyl-3-allyl-urea. |
| (135) | 1-[4′-cyclohexyl-1′,3′,4′-thiadiazoline-thione-(5′)-yl-(2′)]-1,3,3-trimethyl-urea. |
| (136) | 1-[4′-butyl-1′,3′,4′-thiadiazoline.thione-(5′)-yl-(2′)]-3-methyl-urea. |
| (137) | 1-[4′-phenyl-1′,3′,4′-thiadiazol-5′-one-2′-yl]-1,3-dimethyl-3-methoxy-urea. |
| (9) | 1-[4′-lsopropyl-1′,3′,4′-thiadiazol-5′-one-2′-yl]-1,3-dimethyl-urea. |
| (12) | 1-[4′-isopropyl-1′,3′,4′-thiadiazol-5′-one-2′-yl]-1,3,3-trimethyl-urea. |
| (84) | 1-[4′-isopropyl-1′,3′,4′-thiadiazol-5′-one-2′-yl]-1-ethyl-3-methyl-urea. |
| (33) | 1-[4′-(3″-phenyl-propyl)-1′,3′,4′-thiadiazol-5′-one-2′-yl]-1,3,3-trimethyl-urea. |
| (16) | 1-[4′-isobutyl-1′,3′,4′-thiadiazol-5′-one-2′-yl]-1,3-dimethyl-urea. |
| (81) | 1-[4′-isobutyl-1′,3′,4′-thiadiazol-5′-one-2′-yl]-1-ethyl-3-methyl-urea. |
| (80) | 1-[4′-n-butyl-1′,3′,4′-thiadiazol-5′-one-2′-yl]-1-ethyl-3-methyl-urea. |

EXEMPLARY COMPOUNDS OF THE GENERAL FORMULA

| | |
|---|---|
| 175 | 1-[1, 3, 4-thiadiazolone-(5)-yl-(2)]-3-methyl-thiourea. |
| 176 | 1-[1, 3, 4-thiadiazolone-(5)-yl-(2)]-1, 3, dimethyl-thiourea. |
| 177 | 1-[4-methyl-1, 3, 4-thiadiazo lone-(5)-yl-(2)]-3-methyl-thiourea. |
| 178 | 1-[4-methyl-1, 3, 4-thiadiazolone-(5)-yl-(2)]-1, 3-dimethyl-thiourea. |
| 179 | 1-[4-methyl-1, 3, 4-thiadiazolone-(5)-yl-(2)]-1, 3, 3-trimethyl-thiourea. |
| 180 | 1-[4-ethyl-1, 3, 4-thiadiazolone-(5)-yl-(2)]-1, 3-dimethyl-thiourea. |

EXEMPLARY COMPOUNDS OF THE GENERAL FORMULA—Continued 181 1-[4-butyl-1,3,4-thiadiazolone-(5)-yl-(2)]-1,3-dimethyl-thiourea.
182 1-[4-heptyl-1,3,4-thiadiazolone-(5)-yl-(2)]-1,3-dimethyl-thiourea.
183 1-[4-(1-propyl-butyl-1,3,4-thiadiazolone-(5)-yl-(2)]-1,3-dimethyl thiourea.
184 1-[4-(2-ethyl-hexyl)-1,3,4-thiadiazolone-(5)-yl-(2)]-1,3-dimethyl thiourea.
185 1-[4-(1-methyl-dodecyl)-1,3,4-thiadiazolone-(5)-yl-(2)]-1,3-dimethyl thiourea.
186 1-[4-butoxy-ethyl-1,3,4-thiadiazolone-(5)-yl-(2)]-1,3-dimethyl-thiourea.
187 1-[4-benzyl-1,3,4-thiadiazolone-(5)-yl-(2)]-1,3-dimethyl-thiourea.
188 1-[4-chloro-benzyl)-1,3,4-thiadiazolone-(5)-yl-(2)]-1,3-dimethyl-thiourea.
189 1-[4-(4-methoxy-benzyl)-1,3,4-thiadiazolone-(5)-yl-(2)]-1,3-dimethylthiourea.
190 1-[4-(4-butyl-benzyl)-1,3,4-thiadiazolone-(5)-yl-(2)]-1,3-dimethylthiourea.
191 1-[4-(2,4,5-trichloro-benzyl)-1,3,4-thiadiazolone-(5)-yl-(2)]-1,3-dimethyl-thiourea.
192 1-[4-(3-nitro-benzyl)-1,3,4-thiadiazolone-(5)-yl-(2)]-1,3-dimethyl-thiourea.
193 1-[4-(4-cyano-benzyl)-1,3,4-thiadiazolone-(5)-yl-(2)]-1,3-dimethyl-thiourea.
194 1-[4-(4-trifluoromethyl-benzyl)-1,3,4-thiadiazolone-(5)-yl-(2)]-1,3-dimethyl-thiourea.
195 1-[4-(1-phenyl-ethyl)-1,3,4-thiadiazolone-(5)-yl-(2)]-1,3-dimethyl-thiourea.
196 1-[4-diphenylmethyl-1,3,4-thiadiazolone-(5)-yl-(2)]-1,3-dimethyl-thiourea.
197 1-[4-triphenylmethyl-1,3,4-thiadiazolone-(5)-yl-(2)]-1,3-dimethylthiourea.
198 1-[4-(2-(4-methyl-phenyl)-ethyl)-1,3,4-thiadiazolone-(5)-yl-(2)]-1,3-dimethylthiourea.
199 1-[4-(3-phenyl-propyl)-1,3,4-thiadiazolone-(5)-yl-(2)]-1,3-dimethylthiourea.
200 1-[4-(1-naphthyl-(1)-ethyl-1,3,4-thiadiazolone-(5)-yl-(2)]-1,3-dimethylthiourea.
201 1-[4-furfuryl-1,3,4-thiadiazolone-(5)-yl-(2)]-1,3-dimethyl-thiourea.
202 1-[4-cyclopropyl-1,3,4-thiadiazolone-(5)-yl-(2)]-1,3-dimethyl-thiourea.
203 1-[4-cyclopentyl-1,3,4-thiadiazolone-(5)-yl-(2)]-1,3-dimethyl-thiourea.
155 1-[4-cyclohexyl-1,3,4-thiadiazolone-(5)-yl-(2)]-1,3-dimethyl-thiourea.
204 1-[4-cyclododecyl-1,3,4-thiadiazolone-(5)-yl-(2)]-1,3-dimethyl-thiourea.
205 1-[4-(4-methyl-cyclohexyl)-1,3,4-thiadiazolone-(5)-yl-(2)]-1,3-dimethylthiourea.
206 1-[4-(3,4,5-trimethyl-cyclohexene-(2)-yl)-1,3,4-thiadiazolone-(5)-yl-(2)]-1,3-dimethyl-thiourea.
207 1-[4-fluorenyl-(9)-1,3,4-thiadiazolone-(5)-yl-(2)]-1,3-dimethyl-thiourea.
208 1-[4-tetrahydronaphthyl-(1)-1,3,4-thiadiazolone-(5)-yl-(2)]-1,3-dimethyl-thiourea.
209 1-[4-phenyl-1,3,4-thiadiazolone-(5)-yl-(2)]-1,3-dimethyl-thiourea.
139 1-[4-phenyl-1,3,4-thiadiazolone-(5)-yl-(2)]-1,3,3-trimethyl-thiourea.
210 1-[4-(4-chloro-phenyl-)-1,3,4-thiadiazolone-(5)-yl-(2)-]-1,3-dimethylthiourea.
211 1-[4-(3,4-dichloro-phenyl)-1,3,4-thiadiazolone-(5)-yl-(2)]-1,3-dimethylthiourea.
212 1-[4-(4-bromophenyl)-1,3,4-thiadiazolone-(5)-yl-(2)]-1,3-dimethyl-thiourea.
213 1-[4-(4-fluorophenyl-)-1,3,4-thiadiazolone-(5)-yl-(2)]-1,3-dimethyl-thiourea.
214 1-[4-(4-iodophenyl)-1,3,4-thiadiazolone-(5)-yl-(2)]-1,3-dimethylthiourea.
215 1-[4-methyl-phenyl)-1,3,4-thiadiazolone-(5)-yl-(2)]-1,3-dimethyl-thiourea.
216 1-[4-trifluoromethyl-phenyl)-1,3,4-thiadiazolone-(5)-yl-(2)]-1,3-dimethyl-thiourea.
217 1-[4-(2-chloro-4-trifluoromethyl-phenyl)-1,3,4-thiadiazolone-(5)-yl-(2)]-1,3-dimethyl-thiourea.
218 1-[4-(2-nitro-phenyl)-1,3,4-thiadiazolone-(5)-yl-(2)]-1,3-dimethyl thioruea.
219 1-[4-(4-cyano-phenyl)-1,3,4-thiadiazolone-(5)-yl-(2)]1,3-dimethylthiourea.
220 1-[4-naphthyl-(1)-1,3,4-thiadiazolone-(5)-yl-(2)]1,3-dimethyl-thiourea.
221 1-[4-naphthyl-(2)-1,3,4-thiadiazolone-(5)-yl-(2)]-1,3-dimethyl-thiourea.
222 1-[4-methyl-1,3,4-thiadiazolone-(5)-yl-(2)]-1-ethyl-3-zthyl-thiourea.
223 1-[4-ethyl-1,3,4-thiadiazolone-(5)-yl-(2)]-1-butyl-3-methyl-thiourea.
224 1[4-isopropyl-1,3,4-thiadiazolone-(5)-yl-(2)]1-allyl-3-methyl-thiourea.
225 1-[4-butyl-1,3,4-thiadiazolone-(5)-yl-(2)]-1-(2-methoxy-ethyl)-3-methyl-thiourea.
226 1-[4-propyl-1,3,4-thiadiazolone-(5)-yl-(2)]-1-methyl-3-ethyl thiourea.
227 1-[4-propyl-1,3,4-thiadiazolone-(5)-yl-(2)]-q-methyl-3-allyl-thiourea.
228 1-[4-propyl-1,3,4-thiadiazolone-(5)-yl-(2)]-1-methyl-3-propinyl-thiourea.
229 1-[4-phenyl-1,3,4-thiadiazolone-(5)-yl-(2)]-1,3-dimethyl-3-butyl-thiourea.
230 1-[4-phenyl-1,3,4-tladiazolone-(5)-yl-(2)]-1,3-dimethyl-3-propinylthiourea.
231 1-[1,3,4-thiadiazoline thione-(5)-yl-(2)]-3-methylurea.
232 1-[1,3,4-thaidiazoline-thione-(5)-yl-(2)]-1,3-dimethylurea.
233 1-[4-methyl-1,3,4-thiadiazoline-thione-(5)-yl-(2)]-3-methylurea.
234 1-[4-methyl-1,3,4-thiadiazoline-thione-(5)-yl-(2)]-1,3-dimethyl-urea.
235 1-[4-methyl-1,3,4-thiadiazoline-thione-(5)-yl-(2)]-1,3,3-trimethyl urea.

EXEMPLARY COMPOUNDS OF THE GENERAL FORMULA—Continued 236 1-[4-ethyl-1,3,4-thiadazoline-thione-(5)-yl-(2)]-1,3-dimethyl-urea.
237 1-[4-butyl-1,3,4-thiadiazoline-thione-(5)-yl-(2)]-1,3-dimethyl-urea.
238 1-[4-heptyl-1,3,4-thiadiazoline-thione-(5)-yl-(2)]-1,3-dimethyl-urea.
239 1-[4-(1-propyl-butyl)-1,3,4-thiadiazoline-thione-(5)-yl-(2)]-1,3-dimethylurea.
240 1-[4-(2-ethyl-hexyl)-1,3,4-thiadiazoline-thione-(5)-yl-(2)]-1,3-dimethylurea.
241 1-[4-(1-methyl-dodecyl)-1,3,4-thiadiazoline-thione-(5)-yl-(2)]-1,3 dimethylurea.
242 1-[4-butoxy-ethyl-1,3,4-thiadiazoline-thione-(5)-yl-(2)]-1,3-dimethylurea.
243 1-[4-benzyl-1,3,4-thiadiazoline-thione-(5)-yl-(2)]-1,3-dimethyl-urea.
244 1-[4-(4-chloro-benzyl)-1,3,4-thiadiazoline-thione-(5)-yl-(2)]-1,3-dimethylyrea.
245 1-[4-(4-methoxy-benzyl)-1,3,4-thiadiazoline-thione-(5)-yl-(2)]-1,3-dimethylurea.
246 1-[4-(4-butyl-benzyl)-1,3,4-thiadiazoline-thione-(5)-yl-(2)]-1,3-dimethylurea.
247 1-[4-(2,4,5-trichloro-benzyl)-1,3,4-thiadiazoline-thione-(5)-yl-(2)]-1,3-dimethylurea.
248 1-[4-(3-nitro-benzyl)-1,3,4-thiadiazoline-thione-(5)-yl-(2)]-1,3-dimethylurea.
249 1-[4-(4-cyano-benzyl)-1,3,4-thiadiazoline-thione-(5)-yl-(2)]-1,3-dimethylurea.
250 1-[4-(4-trifluoromethyl-benzyl)-1,3,4-thiadiazoline-thione-(5)-yl-(2)]-1,3-dimethylurea.
251 1-[4-(2-phenylethyl)-1,3,4-thiadiazoline-thione-(5)-yl-(2)]-1,3-dimethylurea.
252 1-[4-dipenylmethyl-1,3,4-thiadiazoline-thione-(5)-yl(2)]-1,3-dimethylurea.
253 1-[4-triphenylmethyl-1,3,4-thiadiazoline-thione-(5)-yl-(2)]-1,3-dimethylurea.
254 1-[4-(2-(4-methyl-phenyl)-ethyl)-1,3,4-thiadiazoline-thione-(5)-yl-(2)]-1,3-dimethylurea.
255 1-[4-(3-phenyl-propyl)-1,3,4-thiadiazoline-thione-(5)-yl-(2)]-1,3-dimethylurea.
256 1-[4-(1-naphthyl-(1)-ethyl)-1,3,4-thiadiazoline-thione-(5)-yl-(2)]-1,3-dimethylurea.
257 1-[4-furfuryl-1,3,4-thiadiazoline-thione-(5)-yl-(2)]-1,3-dimethyl-urea.
258 1-[4-cyclopropyl-1,3,4-thiadiazoline-thione-(5)-yl-(2)]-1,3-dimethylurea.
259 1-[4-cyclopentyl-1,3,4-thiadiazoline-thione-(5)-yl-(2)]-1,3-dimethylurea.
140 1-[4-cyclohexyl-1,3,4-thiadiazoline-thione-(5)-yl-(2)]-1,3-dimethylurea.
260 1-[4-cyclododecyl-1,3,4-thiadiazoline-thione-(5)-yl-(2)-1,3-dimethylurea.
261 1-[4-(4-methyl-cyclohexyl)-1,3,4-thiadiazoline-thione-(5)-yl-(2)]-1,3-dimethylurea.
262 1-[4-(3,4,5-trimethyl-cyclohexene-(2)-yl)-1,3,4-thiadiazoline thione-(5)-yl-(2)]-1,3-dimethylurea.
263 1-[4-fluorenyl(9)-1,3,4-thiadiazoline-thione-(5)-yl-(2)]-1,3-dimethylurea.
264 1-[4-tetrahydronaphthyl-(1)-1,3,4-thiadiazoline-thione-(5)-yl-(2)]-1,3-dimethylurea.
265 1-[4-phenyl-1,3,4-thiadiazoline-thione-(5)-yl-(2)]-1,3-dimethyl-urea.
266 1-[4-phenyl-1,3,4-thiadiazoline-thione-(5)-yl-(2)]-1,3,3-trimethylurea.
267 1-[4-(4-chlorophenyl)-1,3,4-thiadiazoline-thione-(5)-yl-(2)] 1,3-dimethylurea.
268 1-[4-(3,4-dichloro-phenyl)-1,3,4-thiadiazoline-thione-(5)-yl-(2)]-1,3-dimethylurea.
269 1-[4-(4-bromo-phenyl)-1,3,4-thiadiazoline-thione-(5)-yl-(2)]-1,3-dimethylurea.
270 1-[4-(4-fluoro-phenyl-)-1,3,4-thiadiazoline-thione-(5)-yl-(2)]-1,3-dimethylurea.
271 1-[4-(4-iodo-phenyl)-1,3,4-thiadiazoline-thione-(5)-yl-(2)]-1,3-dimethylurea.
272 1-[4-(4-methyl-phenyl)-1,3,4-thiadiazoline-thione-(5)-yl-(2)]-1,3-dimethylurea.
273 1-[4-(4-trifluoromethyl-phenyl)-1,3,4-thiadiazoline-thione-(5)-yl-(2)]-1,3-dimethylurea.
274 1-[4-(2-chloro-4-trifluoromethylphenyl)-1,3,4-thiadiazoline-thione-(5)-yl-(2)]-1,3-dimethylurea.
275 1-[4-(2-nitro-phenyl)-1,3,4-thiadiazoline-thione-(5)-yl-(2)]-1,3-dimethylurea.
276 1-[4-(4-cyanophenyl)-1,3,4-thiadiazoline-thione-(5)-yl-(2)]-1,3-dimethylurea.
277 1-[4-naphthyl-(1)-1,3,4-thiadiazoline-thione-(5)-yl-(2)]-1,3-dimethylurea.
278 1-[4-naphthyl-(2)-1,3,4-thiadiazoline-thione-(5)-yl-(2)]-1,3-dimethylurea.
279 1-[4-ethyl-1,3,4-thiadiazoline-thione-(5)-yl-(2)]-1-ethyl-3-methylurea.
280 1-[4-ethyl-1,3,4-thiadiazoline-thione-(5)-yl-(2)]-1-butyl-3-methylurea.
281 1-[4-isopropyl-1,3,4-thiadiazoline-thione-(5)-yl-(2)]-1-allyl-3-methylurea.
282 1-[4-butyl-1,3,4-thiadiazoline-thione-(5)-yl-(2)-1-(2-methoxy-ethyl)-3-methylurea.
283 1-[4-propyl-1,3,4-thiadiazoline-thione-(5)-yl-(2)]-1-methyl-3-ethylurea.
284 1-[4-propyl-1,3,4-thiadiazoline-thione-(5)-yl-(2)]-1-methyl-3-allylurea.
285 1-[4-propyl-1,3,4-thiadiazoline-thione-(5)-yl-(2)]-1-methyl-3-propinylurea.
286 1-[4-phenyl-1,3,4-thiadiazoline-thione-(5)-yl-(2)]-1,3-dimethyl-3-butylurea.
287 1-[4-phenyl-1,3,4-thiadiazoline-thione-(5)-yl-(2)]-1,3-dimethyl 3-propinylurea.
288 1-[4-phenyl-1,3,4-thiadiazoline-thione-(5)-yl-(2)]-1,3-dimethyl-3-methoxyurea.

Advantageously, the instant thiadiazolonyl-ureas exhibit a strong herbicidal potency and can therefore be used as weed killers. By weeds are meant in the widest sense all plants which grow in places where they are not desired. Whether the active compounds according to the present invention act as total or selective herbicidal agents depends on the amount of active compound applied.

The active compounds according to the present invention can be used in the case of, for example, the following plants: dicotylendons, such as mustard (Sinapis), cress (Lepidium), cleaver (Galium), common chickweed (Stellaria), mayweed (Matricaria), smallflower Galinsoga (Galinsoga), fathen (Chemopodium), stinging nettle (Urtica), groundsel (Senecio), cotton (Gossypium), beets (Beta), carrots (Daucus), beans (Phaseolus), potatoes (Solanum), coffee (Coffea); monocotyledons, such as timothy (Phleum), bluegrass (Poa), fescue (Festuca), goosegrass (Eleusine), foxtail (Setaria), ryegrass (Lolium), cheat (Bromus), barnyard grass (Echinochloa), maize (Zea), rice (Oryza), oats (Avena), barley (Hordeum), wheat (Triticum), millet (Panicum), sugar cane (Saccharum); and the like.

The instant thiadiazolonyl-ureas are preferably used as selective herbicides. Such active compounds exhibit a good selectivity in, for example, cotton, cereals such as oats and wheat, and carrots.

The active compounds according to the instant invention can be utilized, if desired, in the form of the usual formulations or compositions with conventional inert pesticidal diluents or extenders, i.e. conventional pesticidal dispersible carrier vehicles, such as solutions, emulsions, suspensions, emulsifiable concentrates, spray powder, pastes, soluble powders, dusting agents, granules, etc. These are prepared in known manner, for instance by extending the active compounds with conventional pesticidal dispersible liquid diluent carriers and/or dispersible solid carriers optionally with the use of carrier vehicle assistants, e.g. conventional pesticidal surface-active agents, including emulsifying agents and/or dispersing agents, whereby, for example, in the case where water is used as diluent, organic solvents may be added as auxiliary solvents.

The following may be chiefly considered for use as conventional carrier vehicles for this purpose: inert dispersible liquid diluent carriers including inert organic solvents, such as aromatic hydrocarbons (e.g. benzene, toluene, xylene, etc.), halogenated, especially chlorinated, aromatic hydrocarbons (e.g. chloro-benzenes), paraffins (e.g. petroleum fractions), chlorinated aliphatic hydrocarbons (e.g. methylene chloride, etc.), alcohols (e.g. methanol, ethanol, propanol, butanol, etc.), ethers, ether-alcohols (e.g. glycol monomethyl ether, etc.), amines (e.g. ethanolamine, etc.), amides (e.g. dimethyl formamide, etc.), sulfoxides (e.g. dimethyl sulfoxide, etc.), ketones (e.g. acetone, etc.), and/or water; as well as inert dispersible finely divided solid carriers such as ground natural minerals (e.g. kaolins, alumina, silica, chalk, i.e. calcium carbonate, talc, kieselguhr, etc.), and ground synthetic minerals (e.g. highly dispersed silicic acid, silicates, e.g. alkali silicates, etc.); whereas the following may be chiefly considered for uses as conventional carrier vehicle assistants, e.g. surface-active agents, for this purpose: emulsifying agents, such as nonionic and/or anionic emulsifying agents (e.g. polyethylene oxide esters of fatty acids, polyethylene oxide ethers of fatty alcohols, alkyl sulfonates, aryl sulfonates, etc., and especially alkyl aryl-polyglycol ethers, magnesium stearate, sodium oleate, etc.); and/or dispersing agents, such as lignin, sulfite waste liquors, methyl cellulose, etc.

As will be appreciated by the artisan, the active compounds according to the instant invention may be employed alone or in the form of mixtures with one another and/or with such solid and/or liquid dispersible carrier vehicles and/or with other known compatible active agents, especially plant protection agents, such as other herbicides, or fungicides, insecticides, bactericides, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1 and 95% by weight, and preferably 0.5 and 90% by weight, of the mixture, whereas carrier composition mixtures suitable for direct application or field application generally contemplate those in which the active compound is present in an amount substantially between about 0.005–1.0%, preferably 0.01–0.5%, by weight of the mixture. Thus, the present invention contemplates overall compositions which comprise mixtures of a conventional dispersible carrier vehicle such as (1) a dispersible inert finely divided carried solid, and/or (2) a dispersible carrier liquid such as an inert organic solvent and/or water preferably including a surface-active amount of a carrier vehicle assistant, e.g. a surface-active agent, such as an emulsifying agent and/or a dispersing agent, and an amount of the active compound which is effective for the purpose in question and which is generally between about 0.005–95%, and preferably 0.01–95%, by weight of the mixture.

In particular, the amount of active compound per unit area varies according to the purpose intended, i.e. the effect desired, and the mode of application. In general, substantially between about 0.25–20 kg. of active compound per hectare are applied, preferably between about 0.5–10 kg. per hectare.

Furthermore, the concentration of the active compound in the usual aqueous preparations and in the case of post-emergence application is, in general, substantially between about 0.005–1.0%, and preferably between about 0.01–0.5%, by weight, as aforesaid.

The active compounds can also be used in accordance with the well-known ultra-low-volume process with good success, i.e. by applying such compound if normally a liquid, or by applying a liquid composition containing the same, via very effective atomizing equipment in finely divided form, e.g. average particle diameter of from 50–100 microns, or even less, i.e. mist form, for example by airplane crop spraying techniques. Only up to at most about a few liters/hectare are needed, and often amounts only up to about 1 quart/acre, preferably 2–16 fluid ounces/acre, are sufficient. In this process it is possible to use highly concentrated liquid compositions with said liquid carrier vehicles containing from about 20 to about 95% by weight of the active compound or even the 100% active substance alone, e.g. about 20–100% by weight of the active compound.

While the active compounds can be used according to the pre-emergence method, they are also particularly effective when used according to the post-emergence method.

Furthermore, the present invention contemplates methods of selectively killing, combating or controlling undesired plants, e.g. weeds and the like, which comprise applying to at least one of (a) such weeds and (b) their habitat, i.e. the locus to be protected, a herbicidally effective or toxic amount of the particular active compound of the invention alone or together with a carrier vehicle as noted above. The instant formulations or compositions are applied in the usual manner, for example by spraying, atomizing, scattering, dusting, watering, sprinkling, and the like, whether for preemergence application to the soil or post-emergence application to the weeds.

It will be realized, of course, that in connection with the pre-emergence use of the instant compounds as well as the post-emergence use thereof, the concentration of the particular active compound utilized in admixture with the carrier vehicle will depend upon the intended application and may be varied within a fairly wide range depending upon the weather conditions, the purpose for which the active compound is used, e.g. as total or only selective herbicidal effect, and the plants which are to be controlled or protected.

Therefore, in special cases, it is possible to go above or below the aforementioned concentration ranges.

The following examples illustrate, without limitation, the herbicidal activity of the particular active compounds of the present invention.

EXAMPLE 1

Pre-emergence test:

Solvent: 5 parts by weight acetone

Emulsifier: 1 part by weight alkylarylpolyglycolether

To produce a suitable preparation of the particular active compound, 1 part by weight of such active compound is mixed with the stated amount of solvent, the stated amount of emulsifier is then added and the resulting concentrate is thereafter diluted with water to the desired final concentration.

Seeds of the test plans are sown in normal soil and, after 24 hours, watered with the given active compound preparation. It is expedient to keep constant the amount of water per unit area. The concentration of the active compound in the preparation is of no importance, only the amount of active compound applied per unit area being decisive. After three weeks, the degree of damage to the test plants is determined and characterized by the values 0–5, which have the following meaning:

0 no effect
1 slight damage or delay in growth
2 marked damage or inhibition of growth
3 heavy damage and only deficient development or only 50% emerged
4 plants partially destroyed after germination or only 25% emerged
5 plants completely dead or not emerged.

The particular active compounds tested, the amounts applied and the results obtained can be seen from the following Table 1:

TABLE 1.—PRE-EMERGENCE TEST

| Active compound | Concentration[1] | Echinochloa | Chenopodium | Sinapis | Oats | Cotton | Wheat | Stellaria | Galinsoga | Matricaria |
|---|---|---|---|---|---|---|---|---|---|---|
| (A) 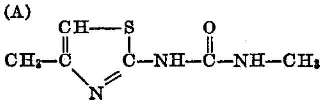 (known). | 10 | 4 | 5 | 4 | 3-4 | 3 | 4 | | | |
| | 5 | 3 | 4 | 2-3 | 3 | 1 | 3 | | | |
| | 2.5 | 2 | 3-4 | 1 | 2 | 0 | 1 | | | |
| (1) | 10 | 5 | 5 | 5 | 0 | 4 | 0 | | | |
| | 5 | 5 | 5 | 5 | 0 | 2 | 0 | | | |
| | 2.5 | 3 | 5 | 4 | 0 | 1 | 0 | | | |
| (45) | 10 | 5 | 5 | 5 | 0 | 2 | 1 | | | |
| | 5 | 5 | 5 | 5 | 0 | 0 | 0 | | | |
| | 2.5 | 3 | 5 | 4 | 0 | 0 | 0 | | | |
| (66) | 10 | 4-5 | 5 | 5 | 0 | 0 | 0 | | | |
| | 5 | 3 | 5 | 4-5 | 0 | 0 | 0 | | | |
| | 2.5 | 2 | 5 | 3 | 0 | 0 | 0 | | | |
| (48) | 10 | 4 | 5 | 5 | 2 | 1 | 1 | | | |
| | 5 | 3-4 | 5 | 5 | 1 | 0 | 0 | | | |
| | 2.5 | 3 | 5 | 5 | 0 | 0 | 0 | | | |
| (49) | 10 | 4-5 | 5 | 5 | 1 | 0 | 1 | | | |
| | 5 | 3 | 5 | 5 | 0 | 0 | 0 | | | |
| | 2.5 | 3 | 5 | 5 | 0 | 0 | 0 | | | |
| (44) | 10 | 2-3 | 5 | 5 | 1 | 0 | 0 | | | |
| | 5 | 2 | 5 | 5 | 0 | 0 | 0 | | | |
| | 2.5 | 1 | 4-5 | 4 | 0 | 0 | 0 | | | |
| (9) | 10 | 5 | 5 | 5 | 5 | 5 | 4-5 | | | |
| | 5 | 5 | 5 | 5 | 5 | 5 | 4 | | | |
| | 2.5 | 5 | 5 | 5 | 5 | 5 | 4 | | | |
| (12) | 10 | 5 | 5 | 5 | 4-5 | 5 | 5 | | | |
| | 5 | 5 | 5 | 5 | 4 | 4 | 4 | | | |
| | 2.5 | 5 | 5 | 5 | 3 | 3 | 3 | | | |
| (16) | 10 | 5 | 5 | 5 | 4-5 | 0 | 4 | | | |
| | 5 | 4-5 | 5 | 5 | 3-4 | 0 | 3 | | | |
| | 2.5 | 3-4 | 5 | 5 | 3 | 0 | 3 | | | |
| (17) | 10 | 5 | 5 | 5 | 1 | 1 | 1 | | | |
| | 5 | 4-5 | 5 | 4-5 | 0 | 0 | 0 | | | |
| | 2.5 | 4 | 5 | 4 | 0 | 0 | 0 | | | |
| (2) | 10 | 5 | 5 | 5 | 1 | 1 | 1 | | | |
| | 5 | 4-5 | 5 | 4-5 | 0 | 0 | 1 | | | |
| | 2.5 | 4 | 5 | 3 | 0 | 0 | 0 | | | |
| (14) | 10 | 5 | 5 | 5 | 2 | 0 | 2 | | | |
| | 5 | 5 | 5 | 4-5 | 1 | 0 | 1 | | | |
| | 2.5 | 4-5 | 5 | 4 | 0 | 0 | 0 | | | |
| (15) | 10 | 4-5 | 5 | 5 | 2 | 0 | 2 | | | |
| | 5 | 4 | 5 | 4-5 | 0 | 0 | 1 | | | |
| | 2.5 | 3 | 4 | 4 | 0 | 0 | 0 | | | |
| (18) | 10 | 5 | 5 | 5 | 4 | 2 | 4 | | | |
| | 5 | 4 | 5 | 5 | 4 | 2 | 3 | | | |
| | 2.5 | 3 | 4 | 4 | 2 | 1 | 2 | | | |
| (7) | 10 | 5 | 5 | 5 | 5 | 5 | 5 | | | |
| | 5 | 5 | 5 | 5 | 5 | 4-5 | 4 | | | |
| | 2.5 | 4-5 | 5 | 5 | 4 | 3 | 3 | | | |
| (58) | 10 | 4-5 | 5 | 5 | 1 | 3 | 1 | | | |
| | 5 | 4 | 5 | 4-5 | 0 | 2 | 0 | | | |
| | 2.5 | 4 | 4-5 | 4 | 0 | 1 | 0 | | | |
| (59) | 10 | 4-5 | 5 | 4-5 | 0 | 0 | 0 | | | |
| | 5 | 5 | 5 | 4 | 0 | 0 | 0 | | | |
| | 2.5 | 4 | 4-5 | 3-4 | 0 | 0 | 0 | | | |

See footnote at end of table.

TABLE 1.—PRE-EMERGENCE TEST

| Active compound | Concentration[1] | Echinochloa | Chenopodium | Sinapis | Oats | Cotton | Wheat | Stellaria | Galinsoga | Matricaria |
|---|---|---|---|---|---|---|---|---|---|---|
| (74) | 10 | 5 | 5 | 5 | 1-2 | 0 | 1 | | | |
| | 5 | 4-5 | 5 | 5 | 0 | 0 | 0 | | | |
| | 2.5 | 4 | 5 | 4 | 0 | 0 | 0 | | | |
| (32) | 10 | 5 | 5 | 5 | 1-2 | 2 | 2 | | | |
| | 5 | 5 | 5 | 4-5 | 0 | 1 | 1 | | | |
| | 2.5 | 3-4 | 5 | 4 | 0 | 0 | 0 | | | |
| (36) | 10 | 5 | 5 | 5 | 3 | 2 | 4 | | | |
| | 5 | 5 | 5 | 5 | 3 | 2 | 4 | | | |
| | 2.5 | 5 | 5 | 4-5 | 2 | 0 | 2 | | | |
| (79) | 10 | 5 | 5 | 5 | 5 | 5 | 5 | | | |
| | 5 | 5 | 5 | 5 | 5 | 5 | 5 | | | |
| | 2.5 | 5 | 5 | 5 | 5 | 5 | 5 | | | |
| (81) | 10 | 5 | 5 | 5 | 5 | 4-5 | 5 | | | |
| | 5 | 5 | 5 | 5 | 4-5 | 3-4 | 5 | | | |
| | 2.5 | 4 | 5 | 5 | 4 | 3 | 4 | | | |
| (84) | 10 | 5 | 5 | 5 | 5 | 5 | 5 | | | |
| | 5 | 5 | 5 | 5 | 4-5 | 5 | 5 | | | |
| | 2.5 | 5 | 5 | 5 | 4 | 4-5 | 4-5 | | | |
| (156) | 20 | 4 | 5 | 5 | 3 | 3 | 3 | 5 | 4 | 5 |
| | 10 | 2 | 5 | 5 | 1 | 2 | 1 | 5 | 3 | 5 |
| | 5 | 1 | 5 | 4-5 | 0 | 0 | 0 | 5 | 2 | 5 |
| (145) | 20 | 5 | 5 | 5 | 3 | 4 | 3 | 5 | 5 | 5 |
| | 10 | 4 | 5 | 5 | 3 | 3 | 1 | 5 | 5 | 5 |
| | 5 | 3 | 4-5 | 4 | 2 | 3 | 0 | 5 | 5 | 5 |
| (138) | 20 | 5 | 5 | 5 | 3 | 2 | 2 | 5 | 5 | 5 |
| | 10 | 4 | 5 | 4 | 2 | 1 | 1 | 5 | 5 | 5 |
| | 5 | 3 | 5 | 3 | 1 | 0 | 0 | 5 | 5 | 5 |
| (163) | 20 | 3-4 | 5 | 5 | 0 | 2 | 3 | 5 | 5 | 5 |
| | 10 | 3 | 5 | 5 | 0 | 0 | 1 | 5 | 5 | 5 |
| | 5 | 2 | 5 | 4 | 0 | 0 | 0 | 5 | 5 | 5 |
| (153) | 20 | 5 | 5 | 5 | 2 | 2 | 3 | 5 | 5 | 5 |
| | 10 | 4 | 5 | 5 | 1 | 0 | 2 | 5 | 5 | 5 |
| | 5 | 3-4 | 5 | 5 | 0 | 0 | 0 | 5 | 5 | 5 |

[1] Active compound in kg./hectare.

EXAMPLE 2

Post-emergence test:

Solvent: 5 parts by weight acetone

Emulsifier: 1 part by weight alkylarylpolyglycolether

To produce a suitable preparation of the particular active compound, 1 part by weight of such active compound is mixed with the stated amount of solvent, the stated amount of emulsifier is then added and the resulting concentrate is thereafter diluted with water to the desired final concentration.

Test plants which have a height of about 5–15 cm. are sprayed with the given active compound preparation until just dew moist. After three weeks, the degree of damage to the plants is determined and characterized by the values 0–5, which have the the following meaning:

0 no effect
1 a few slightly burnt spots
2 marked damage to leaves
3 some leaves and parts of stalks partially dead
4 plant partially destroyed
5 plant completely dead.

The particular active compounds tested, their concentrations and the results obtained can be seen from the following Table 2:

TABLE 2.—POST-EMERGENCE TEST

| Active compound | Concentration[1] | Echinochloa | Chenopodium | Sinapis | Galinsoga | Stellaria | Urtica | Matricaria | Oats | Cotton | Wheat | Carrots |
|---|---|---|---|---|---|---|---|---|---|---|---|---|
| (A) 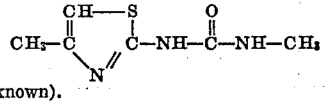 (known). | 0.1 | 4 | 5 | 5 | 4-5 | 4-5 | 3 | 3 | 1-2 | 2-3 | 1-2 | 3 |
| | 0.05 | 3 | 4-5 | 4-5 | 4 | 3 | 1 | 2 | 1 | 2 | 1 | 1 |
| | 0.025 | 1 | 3 | 4 | 3 | 2 | 0 | 1 | 0 | 0 | 0 | 0 |
| (1) | 0.1 | 5 | 5 | 5 | 5 | 5 | 5 | 5 | 1-2 | 4-5 | 4-5 | 5 |
| | 0.05 | 5 | 5 | 5 | 5 | 5 | 5 | 4 | 1 | 4 | 4 | 5 |
| | 0.025 | 4-5 | 5 | 5 | 5 | 5 | 5 | 3 | 0 | 4 | 3 | 5 |
| (62) | 0.1 | 5 | 5 | 5 | 5 | 5 | 5 | 3 | 4 | 5 | 4 | 5 |
| | 0.05 | 5 | 5 | 5 | 5 | 5 | 5 | 2 | 3 | 5 | 4 | 5 |
| | 0.025 | 5 | 5 | 5 | 5 | 5 | 5 | 1 | 2 | 5 | 4 | 5 |
| (66) | 0.1 | 5 | 5 | 5 | 5 | 5 | 5 | 3 | 4-5 | 5 | 4-5 | 2 |
| | 0.05 | 5 | 5 | 5 | 5 | 5 | 5 | 2 | 4 | 5 | 4 | 1 |
| | 0.025 | 5 | 5 | 5 | 5 | 5 | 5 | 1 | 3 | 5 | 2 | 0 |
| (48) | 0.1 | 5 | 5 | 5 | 5 | 5 | 5 | 5 | 4 | 5 | 4 | 5 |
| | 0.05 | 5 | 5 | 5 | 5 | 5 | 5 | 4 | 3-4 | 5 | 3-4 | 5 |
| | 0.025 | 5 | 5 | 5 | 5 | 5 | 5 | 4 | 3 | 5 | 3 | 5 |

See footnote at end of table.

TABLE 2.—POST-EMERGENCE TEST.—Continued

| Active compound | Concentration[1] | Echinochloa | Chenopodium | Sinapis | Galinsoga | Stellaria | Urtica | Matricaria | Oats | Cotton | Wheat | Carrots |
|---|---|---|---|---|---|---|---|---|---|---|---|---|
| (49) | 0.1 | 5 | 5 | 5 | 5 | 5 | 5 | 2-3 | 5 | 5 | 5 | 2-3 |
| | 0.05 | 5 | 5 | 5 | 5 | 5 | 5 | 2 | 5 | 5 | 4 | 1 |
| | 0.025 | 5 | 5 | 5 | 5 | 5 | 5 | 2 | 4 | 4 | 3 | 0 |
| (4) | 0.1 | 4 | 4-5 | 5 | 5 | 4 | 5 | 5 | 4 | 3-4 | 3 | 3 |
| | 0.05 | 3 | 4-5 | 4 | 5 | 3 | 4-5 | 4 | 2 | 3-4 | 3 | 2 |
| | 0.025 | 1 | 4-5 | 4 | 3 | 3 | 4 | 4 | 2 | 2-3 | 1 | 1 |
| (9) | 0.1 | 5 | 5 | 5 | 5 | 5 | 5 | 5 | 5 | 5 | 5 | 5 |
| | 0.05 | 5 | 5 | 5 | 5 | 5 | 5 | 5 | 5 | 5 | 5 | 5 |
| | 0.025 | 5 | 5 | 5 | 5 | 5 | 5 | 5 | 4 | 5 | 4 | 5 |
| (16) | 0.1 | 5 | 5 | 5 | 5 | 5 | 5 | 5 | 4-5 | 2 | 4 | 5 |
| | 0.05 | 5 | 5 | 5 | 5 | 5 | 5 | 5 | 3 | 0 | 3-4 | 4 |
| | 0.025 | 5 | 5 | 5 | 5 | 5 | 4 | 4 | 2 | 0 | 2 | 3 |
| (17) | 0.1 | 5 | 5 | 5 | 5 | 4-5 | 4 | 4 | 4 | 2 | 4 | 2 |
| | 0.05 | 5 | 5 | 5 | 3 | 4-5 | 3 | 3 | 3 | 2 | 4 | 0 |
| | 0.025 | 4 | 4-5 | 5 | 3 | 4 | 2 | 2 | 3 | 2 | 2 | 0 |
| (38) | 0.1 | 5 | 5 | 5 | 5 | 5 | 5 | 5 | 5 | 5 | 5 | - |
| | 0.05 | 5 | 5 | 5 | 5 | 5 | 5 | 5 | 4-5 | 5 | 5 | - |
| | 0.025 | 5 | 5 | 5 | 5 | 5 | 5 | 4 | 4-5 | 4-5 | 5 | - |
| (18) | 0.1 | 5 | 5 | 5 | 5 | 5 | 5 | 5 | 5 | 5 | 5 | 5 |
| | 0.05 | 5 | 5 | 5 | 5 | 5 | 5 | 5 | 5 | 5 | 4-5 | 5 |
| | 0.025 | 5 | 5 | 5 | 5 | 5 | 4 | 4 | 4 | 4 | 4 | 4 |
| (7) | 0.1 | 5 | 5 | 5 | 5 | 5 | 5 | 5 | 4-5 | 4-5 | 4-5 | 5 |
| | 0.05 | 5 | 5 | 5 | 5 | 5 | 5 | 5 | 3-4 | 4 | 4 | 4 |
| | 0.025 | 5 | 5 | 5 | 5 | 5 | 4 | 4 | 2 | 3 | 3 | 3 |
| (65) | 0.1 | 5 | 5 | 5 | 5 | 5 | 5 | 5 | 4 | 1 | 1 | 0 |
| | 0.05 | 5 | 5 | 5 | 5 | 5 | 5 | 4 | 3 | 0 | 0 | 0 |
| | 0.025 | 4 | 5 | 5 | 4 | 4 | 5 | 3 | 3 | 0 | 0 | 0 |
| (70) | 0.1 | 5 | 5 | 5 | 5 | 5 | 5 | 4 | 5 | 5 | 5 | 2 |
| | 0.05 | 5 | 5 | 5 | 5 | 5 | 5 | 3 | 4 | 5 | 4 | 0 |
| | 0.025 | 5 | 5 | 5 | 5 | 5 | 5 | 2 | 3 | 4-5 | 3 | 0 |
| (32) | 0.1 | 5 | 5 | 5 | 5 | 5 | 5 | 5 | 5 | 5 | 4 | 5 |
| | 0.05 | 5 | 5 | 5 | 5 | 5 | 5 | 5 | 4-5 | 5 | 2 | 5 |
| | 0.025 | 5 | 5 | 5 | 5 | 5 | 5 | 5 | 4 | 5 | 1 | 4-5 |
| (36) | 0.1 | 5 | 5 | 5 | 5 | 5 | 5 | 5 | 5 | 4 | 4-5 | 5 |
| | 0.05 | 5 | 5 | 5 | 5 | 5 | 5 | 5 | 5 | 3-4 | 4 | 5 |
| | 0.025 | 5 | 5 | 5 | 5 | 5 | 5 | 5 | 5 | 3 | 3 | 5 |
| (79) | 0.1 | 5 | 5 | 5 | 5 | 5 | 5 | 5 | 4-5 | 5 | 5 | 5 |
| | 0.05 | 5 | 5 | 5 | 5 | 5 | 5 | 5 | 2-3 | 5 | 3 | 5 |
| | 0.025 | 5 | 5 | 5 | 5 | 5 | 5 | 5 | 0 | 5 | 2 | 5 |
| (81) | 0.1 | 5 | 5 | 5 | 5 | 5 | 5 | 5 | 4 | 3 | 5 | 5 |
| | 0.05 | 5 | 5 | 5 | 5 | 5 | 5 | 5 | 2 | 2 | 4 | 5 |
| | 0.025 | 5 | 5 | 5 | 5 | 5 | 5 | 4 | 0 | 0 | 3 | 5 |
| (84) | 0.1 | 5 | 5 | 5 | 5 | 5 | 5 | 5 | 5 | 5 | 5 | 5 |
| | 0.05 | 5 | 5 | 5 | 5 | 5 | 5 | 5 | 5 | 5 | 5 | 5 |
| | 0.025 | 5 | 5 | 5 | 5 | 5 | 5 | 5 | 4 | 5 | 5 | 5 |
| (156) | 5 | 5 | 5 | 5 | 5 | 5 | 5 | - | 4-5 | 5 | 4 | 1 |
| | 2.5 | 5 | 5 | 5 | 5 | 5 | 5 | - | 4 | 5 | 3 | 0 |
| | 1.25 | 4 | 5 | 5 | 4-5 | 4-5 | 5 | - | 3-4 | 4-5 | 2 | 0 |
| (145) | 5 | 5 | 5 | 5 | 5 | 5 | 5 | - | 4 | 3 | 3 | 1 |
| | 2.5 | 4-5 | 4-5 | 5 | 4 | 4 | 5 | - | 3 | 2 | 1 | 0 |
| | 1.25 | 4 | 4 | 5 | 3 | 3 | 4-5 | - | 2 | 0 | 0 | 0 |
| (138) | 5 | 5 | 5 | 5 | 5 | 5 | 5 | - | 4 | 2 | 3 | 2 |
| | 2.5 | 5 | 5 | 5 | 4-5 | 4 | 5 | - | 3 | 0 | 2 | 0 |
| | 1.25 | 5 | 4 | 5 | 4 | 3 | 4 | - | 3 | 0 | 0 | 0 |
| (142) | 5 | 4-5 | 5 | 5 | 3 | 4 | 5 | - | 4 | 4 | 3 | 1 |
| | 2.5 | 4 | 4-5 | 5 | 2 | 2 | 3 | - | 3-4 | 3 | 2 | 0 |
| | 1.25 | 2 | 4 | 4 | 1 | 0 | 2 | - | 2 | 1 | 0 | 0 |
| (153) | 5 | 5 | 5 | 5 | 5 | 5 | 5 | - | 3 | 1 | 5 | 1 |
| | 2.5 | 5 | 5 | 5 | 4 | 4-5 | 5 | - | 2 | 0 | 4 | 0 |
| | 1.25 | 4 | 4-5 | 5 | 3 | 4 | 5 | - | 1 | 0 | 3 | 0 |
| (139) | 5 | 5 | 4-5 | 5 | 5 | 5 | 5 | - | 2 | 3 | 4 | 0 |
| | 2.5 | 4-5 | 4 | 5 | 5 | 5 | 5 | - | 0 | 0 | 3 | 0 |
| | 1.25 | 3 | 3 | 5 | 4 | 5 | 5 | - | 0 | 0 | 3 | 0 |
| (174) | 5 | 5 | 5 | 5 | 5 | 5 | 5 | - | 4 | 2 | 2 | 5 |
| | 2.5 | 5 | 5 | 5 | 5 | 5 | 5 | - | 3-4 | 1 | 1 | 5 |
| | 1.25 | 4 | 5 | 5 | 4 | 4 | 4 | - | 2 | 0 | 0 | 3-4 |

[1] Active compound in percent.

The following further examples are set forth to illustrate, without limitation, the process for the production of the particular new compounds in accordance with the present invention.

EXAMPLE 3

[Reaction variant (b)]

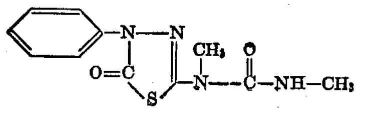

(1)

20.7 g. (0.1 mol) 2-methylamino-4-phenyl-1,3,4-thiadiazol-5-one are dissolved in 120 ml. of dimethyl formamide. After addition of a catalytic amount of triethylenediamine, there are added dropwise at room temperature 5.7 g. (0.1 mol) of methyl isocyanate. The mixture is stirred for 1 hour at room temperature, 1 hour at 35–40° C. and 1 hour at 70–75° C., cooling to room temperature is effected, and the reaction product is precipitated by addition of water. The product is dried and recrystallized from butanol. Yield: 23.2 g. (88% of the theory) of 1-[4'-phenyl - 1',3',4' - thiadiazol-5'-one-2'-yl]-1,3-dimethylurea, M.P. 197–198° C.

EXAMPLE 4

[Reaction variant (a)]

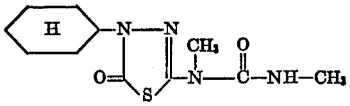

(2)

26 g. (0.1 mol) of 2-(N-methyl-N-chlorocarbonyl-amino)-4-cyclohexyl-1,3,4-thiadiazolin-5-one are dissolved in 125 ml. of acetone. 17 g. (0.22 mol) of a 40% aqueous methylamine solution are added dropwise at room temperature, with stirring and cooling. Stirring is continued for 1 hour, 250 ml. of water are added and the precipitated product is filtered off with suction. After drying, 24.8 g. (92% of the theory) of 1-[4′-cyclohexyl-1′,3′,4′-thiadiazol-5′-one-2′-yl]-1,3-dimethyl urea are obtained, M.P. 196–198° C.

EXAMPLE 5

[Reaction variant (a)]

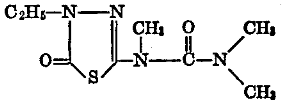

(3)

9.9 g. (0.22 mol) of dimethyl amine are introduced at 20 to 25° C. into a solution of 22.2 g. (0.1 mol) of 2-(N-methyl - N - chlorocarbonyl-amino)-4-ethyl - 1,3 - thiadiazolin-5-one in 125 ml. benzene, with cooling. The mixture is stirred for 1 hour at room temperature, then washed twice with water, and the benzene solution is evaporated in a vacuum. There remains as residue 1-[4′-ethyl - 1′,3′,4′ - thiadiazol-5′-one-2′-yl] - 1,3,3 - trimethylurea in practically quantitative yield. Recrystallized from white spirit, it melts at M.P. 60–62° C.

EXAMPLE 6

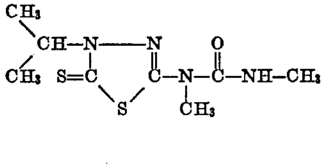

(138)

To a suspension of 19.1 g. (0.1 mol) 2-(N-methyl-N-chlorocarbonylamino)-4-isopropyl - 1,3,4 - thiadiazoline-5-thione in 125 ml. acetone there are added dropwise at room temperature, with cooling, 17 g. (0.22 mol) of a 407 aqueous methylamine solution. The clear solution formed is, after completion of the exothermic reaction, stirred for 1 hour at room temperature and then evaporated in vacuo. The crystals obtained after washing with water the residue which remains are filtered off with suction and dried.

Yield: 22.4 g. (91% of the theory); M.P. 184–185° C. (toluene).

EXAMPLE 7

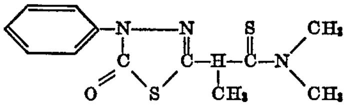

(139)

28.5 g. (0.1 mol) 2-(N-methyl-N-chlorothiocarbonyl-amino)-4-phenyl-1,3,4-thiadiazoline-5-one are dissolved in 150 ml. benzene. 10 g. (0.22 mol) of gaseous dimethylamine are introduced at room temperature, with cooling. The mixture is stirred for one hour at room temperature, washed with water, dried over sodium sulphate and evaporated in vacuo. There remain 25.6 g. (87% of the theory) of crystals which, after reprecipitation from ether/ligroin, melt at 87° C.

EXAMPLE 8

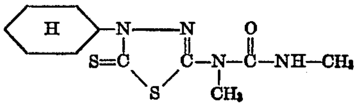

(140)

To a solution of 22.9 g. (0.1 mol) 2-methylamino-4-cyclohexyl-1,3,4-thriadiazoline-5-thione and 125 ml. benzene there are added dropwise at room temperature, after addition of a catalytic amount of triethylenediamine, 5.7 g. (0.1 mol) methylisocyanate. The mixture is stirred for 1 hour at room temperature, 1 hour at 35° to 40° C. and 1 hour at 70° to 75° C. and then evaporated in vacuo, the above-mentioned product remaining behind in practically quantitative yield; M.P. 189–190° C. (ethanol).

EXAMPLE 9

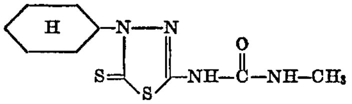

(174)

21.5 g. (0.1 mol) 2-amino-4-cyclohexyl-1,3,4-thiadiazolin-5-thione and 10 g. (0.175 mol) methyl isocyanate are refluxed in 100 ml. dioxan in the presence of 0.1 g. stannous octoate for 8 hours. After cooling to room-temperature the reaction-product is filtered off with suction. Yield: 14 g. (51.5%); M.P. 277° C. (glycol monomethyl ether).

In corresponding manner, other compounds of Formula I above mentioned are also obtained. The following Table 3 lists the physical properties of various compounds of Formula I:

TABLE 3

| No. | R | R′ | R″ | R‴ | X | Y | M.P. (° C.) | Recrystallized from— |
|---|---|---|---|---|---|---|---|---|
| (1) | 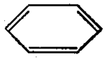 | $CH_3$ | H | $CH_3$ | O | O | 197–198 | Butanol. |
| (2) | 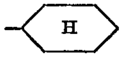 | $CH_3$ | H | $CH_3$ | O | O | 196–198 | |
| (3) | $-C_2H_5$ | $CH_3$ | $CH_3$ | $CH_3$ | O | O | 60–62 | White spirit. |
| (4) | $-CH_3$ | $CH_3$ | H | $CH_3$ | O | O | 214–215 | Butanol. |
| (5) | $-CH_3$ | $CH_3$ | $CH_3$ | $CH_3$ | O | O | 111–112 | Water. |
| (6) | $-C_2H_5$ | $CH_3$ | H | $CH_3$ | O | O | 175–177 | Toluene. |
| (7) | $-C_3H_7$-n | $CH_3$ | H | $CH_3$ | O | O | 135–136 | Do. |
| (8) | $-C_3H_7$-n | $CH_3$ | $CH_3$ | $CH_3$ | O | O | 69 | White spirit. |
| (9) | $-CH(CH_3)_2$ | $CH_3$ | H | $CH_3$ | O | O | 163–165 | Toluene. |
| (10) | $-CH(CH_3)_2$ | $CH_3$ | H | $C_2H_5$ | O | O | 146–147 | White spirit. |
| (11) | $-CH(CH_3)_2$ | $CH_3$ | H | $CH_2-CH=CH_2$ | O | O | 126–127 | Do. |
| (12) | $-CH(CH_3)_2$ | $CH_3$ | $CH_3$ | $CH_3$ | O | O | 68–70 | Do. |
| (13) | $-CH(CH_3)_2$ | $CH_3$ | $C_2H_5$ | $C_2H_5$ | O | O | 45–46 | Ligroin. |
| (14) | $-C_4H_9$-n | $CH_3$ | H | $CH_3$ | O | O | 123–125 | Carbon tetrachloride. |
| (15) | $-C_4H_9$-n | $CH_3$ | $CH_3$ | $CH_3$ | O | O | Oil | |
| (16) | $-CH_2-CH(CH_3)_2$ | $CH_3$ | H | $CH_3$ | O | O | 155–157 | Toluene. |
| (17) | $-CH_2-CH(CH_3)_2$ | $CH_3$ | $CH_3$ | $CH_3$ | O | O | 72–7 | White spirit. |
| (18) | $-CH(CH_3)-C_2H_5$ | $CH_3$ | H | $CH_3$ | O | O | 150–152 | Toluene. |
| (19) | Same as above | $CH_3$ | H | $C_2H_5$ | O | O | 128–129 | Do. |
| (20) | do | $CH_3$ | H | $CH_2-CH=CH_2$ | O | O | 83–85 | White spirit. |
| (21) | do | $CH_3$ | $CH_3$ | $CH_3$ | O | O | Oil | |
| (22) | 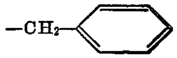 | $CH_3$ | H | $CH_3$ | O | O | 194–196 | Butanol. |
| (23) | Same as above | $CH_3$ | $CH_3$ | $CH_3$ | O | O | 71–72 | White spirit. |
| (24) | 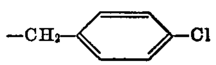 | $CH_3$ | H | $CH_3$ | O | O | 235–236 | Glycol monomethyl ether. |
| (25) | Same as above | $CH_3$ | $CH_3$ | $CH_3$ | O | O | Oil | |
| (26) | 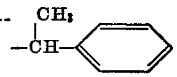 | $CH_3$ | H | $CH_3$ | O | O | 200 | Butanol. |
| (27) | Same as above | $CH_3$ | $CH_3$ | $CH_3$ | O | O | 75–77 | White spirit. |
| (28) | 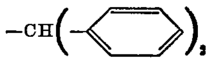 | $CH_3$ | H | $CH_3$ | O | O | 221 | Butanol. |
| (29) | Same as above | $CH_3$ | $CH_3$ | $CH_3$ | O | O | 117–119 | White spirit. |
| (30) | 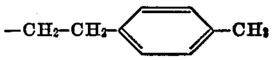 | $CH_3$ | H | $CH_3$ | O | O | 148–150 | Toluene. |
| (31) | Same as above | $CH_3$ | $CH_3$ | $CH_3$ | O | O | 106–107 | White spirit. |

TABLE 3—Continued

| No. | R | R′ | R″ | R‴ | X | Y | M.P. (° C.) | Recrystallized from— |
|---|---|---|---|---|---|---|---|---|
| (32) | $-(CH_2)_3-$  | $CH_3$ | H | $CH_3$ | O | O | 121–123 | Carbon tetrachloride/ligroin. |
| (33) | Same as above | $CH_3$ | $CH_3$ | $CH_3$ | O | O | 62 | White spirit. |
| (34) | $-CH_2-$ 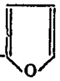 | $CH_3$ | H | $CH_3$ | O | O | 197 | Ethanol. |
| (35) | Same as above | $CH_3$ | $CH_3$ | $CH_3$ | O | O | 90–92 | White spirit. |
| (36) |  | $CH_3$ | H | $CH_3$ | O | O | 173 | Ethanol. |
| (37) | Same as above | $CH_3$ | $CH_3$ | $CH_3$ | O | O | 85–86 | White spirit. |
| (38) | 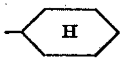 | $CH_3$ | $CH_3$ | $CH_3$ | O | O | 121–123 | Do. |
| (39) | 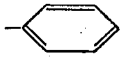 | $CH_3$ | H | $C_2H_5$ | O | O | 196–197 | Butanol. |
| (40) | Same as above | $CH_3$ | H | $C_3H_7$-n | O | O | 177–178 | Do. |
| (41) | do | $CH_3$ | H | $-CH(CH_3)_2$ | O | O | 184–185 | Ethanol. |
| (42) | do | $CH_3$ | H | 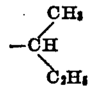 | O | O | 162–163 | Do. |
| (43) | do | $CH_3$ | H | $-C(CH_3)_3$ | O | O | 191–192 | Butanol. |
| (44) | do | $CH_3$ | H | $-CH_2-CH=CH_2$ | O | O | 169–170 | Ethanol. |
| (45) | do | $CH_3$ | $CH_3$ | $CH_3$ | O | O | 103 | White spirit. |
| (46) | do | $CH_3$ | $C_2H_5$ | $C_2H_5$ | O | O | Oil | |
| (47) | do | $CH_3$ | $-CH_2-OH=CH_2$ | $-CH_2-CH=CH_2$ | O | O | 66–67 | White spirit. |
| (48) | do | $C_2H_5$ | H | $CH_3$ | O | O | 194–195 | Methanol. |
| (49) | do | $C_2H_5$ | $CH_3$ | $CH_3$ | O | O | 78–80 | Do. |
| (50) | do | $C_3H_7$-n | H | $CH_3$ | O | O | 167–168 | Ethanol. |
| (51) | do | $C_3H_7$-n | $CH_3$ | $CH_3$ | O | O | 47 | White spirit. |
| (52) | do | $-CH(CH_3)_2$ | H | $CH_3$ | O | O | 162–164 | Toluene. |
| (53) | do | $CH_2-CH(CH_3)_2$ | H | $CH_3$ | O | O | 158–160 | Ethanol. |
| (54) | do | $CH_2-CH(CH_3)_2$ | $CH_3$ | $CH_3$ | O | O | 48–50 | White spirit. |
| (55) | do | $CH_2-CH=CH_2$ | H | $CH_3$ | O | O | 144–145 | Carbon tetrachloride. |
| (56) | do | $CH_2-CH=CH_2$ | $CH_3$ | $CH_3$ | O | O | 48 | Ligroin. |
| (57) | do | $-(CH_2)_3-O-C_4H_9$-n | H | $CH_3$ | O | O | 54–56 | White spirit. |
| (58) | 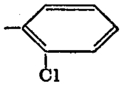 | $CH_3$ | H | $CH_3$ | O | O | 258 | Dioxan. |
| (59) | Same as above | $CH_3$ | $CH_3$ | $CH_3$ | O | O | 178 | Butanol. |
| 60) | 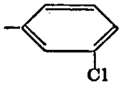 | $CH_3$ | H | $CH_3$ | O | O | 209–210 | Do. |
| (61) | Same as above | $CH_3$ | $CH_3$ | $CH_3$ | O | O | 90 | Ethanol. |

TABLE 3—Continued

| No | R | R′ | R″ | R‴ | X | Y | M.P. (° C.) | Recrystallized from— |
|---|---|---|---|---|---|---|---|---|
| (62) |  | $CH_3$ | H | $CH_3$ | O | O | 163–165 | Ethyl acetate. |
| (63) | Same as above | $CH_3$ | H | $C_2H_5$ | O | O | 188 | Butanol. |
| (64) | do | $CH_3$ | H | $-CH(CH_3)_2$ | O | O | 173–174 | Do. |
| (65) | do | $CH_3$ | H | $-CH_2-CH=CH_2$ | O | O | 157 | Ethanol. |
| (66) | do | $CH_3$ | $CH_3$ | $CH_3$ | O | O | 128–130 | White spirit. |
| (67) | 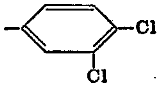 | $CH_3$ | H | $CH_3$ | O | O | 210 | Ethanol. |
| (68) | 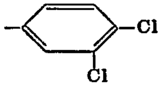 | $CH_3$ | $CH_3$ | $CH_3$ | O | O | 136–138 | Do. |
| (69) | 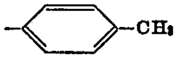 | $CH_3$ | H | $CH_3$ | O | O | 188–189 | Do. |
| (70) | Same as above | $CH_3$ | $CH_3$ | $CH_3$ | O | O | 93–95 | White spirit. |
| (71) | 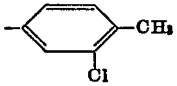 | $CH_3$ | H | $CH_3$ | O | O | 223–225 | Butanol. |
| (72) | Same as above | $CH_3$ | $CH_3$ | $CH_3$ | O | O | 105–107 | Ethanol. |
| (73) |  | $CH_3$ | H | $CH_3$ | O | O | >270 | Butanol. |
| (74) | 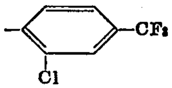 | $CH_3$ | H | $CH_3$ | O | O | 212–214 | Ethanol. |
| (75) | Same as above | $CH_3$ | $CH_3$ | $CH_3$ | O | O | 145–146 | Do. |
| (76) | 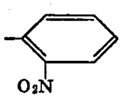 | $CH_3$ | H | $CH_3$ | O | O | 218 | Butanol. |
| (77) | Same as above | $CH_3$ | $CH_3$ | $CH_3$ | O | O | 155 | Do. |
| (78) | $C_2H_5$ | $C_2H_5$ | H | $CH_3$ | O | O | 138–140 | Ethyl acetate/ligroin. |
| (79) | $C_3H_7$-n | $C_2H_5$ | H | $CH_3$ | O | O | 146–148 | Methanol. |
| (80) | $C_4H_9$-n | $C_2H_5$ | H | $CH_3$ | O | O | 140 | White spirit. |
| (81) | $(CH_3)_2CH-CH_2$ | $C_2H_5$ | H | $CH_3$ | O | O | 138–140 | Carbon tetrachloride. |
| (82) | 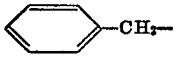 | $C_2H_5$ | H | $CH_3$ | O | O | 159 | Ethanol. |
| (83) | Same as above | $C_2H_5$ | $CH_3$ | $CH_3$ | O | O | 68–70 | White spirit. |
| (84) | $(CH_3)_2CH-$ | $C_2H_5$ | H | $CH_3$ | O | O | 168 | Toluene/ligroin. |
| (85) | 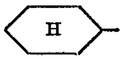 | $C_2H_5$ | H | $CH_3$ | O | O | 223–225 | White spirit. |
| (86) | Same as above | $C_2H_5$ | $CH_3$ | $CH_3$ | O | O | 77–78 | Ligroin. |

TABLE 3—Continued

| No. | R | R′ | R″ | R‴ | X | Y | M.P. (° C.) | Recrystallized from— |
|---|---|---|---|---|---|---|---|---|
| (87) | 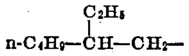 | $CH_3$ | H | $CH_3$ | O | O | 86 | White spirit. |
| (88) | 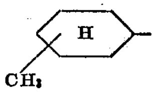 m-,p-mixture. | $CH_3$ | H | $CH_3$ | O | O | 167-169 | Toluene. |
| (89) | Same as above | $CH_3$ | $CH_3$ | $CH_3$ | O | O | 60-62 | White spirit. |
| (90) | 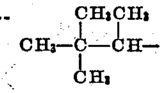 | $CH_3$ | H | $CH_3$ | O | O | 164-166 | Carbon tetrachloride. |
| (91) | 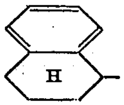 | $CH_3$ | H | $CH_3$ | O | O | 224-226 | Butanol. |
| (92) | Same as above | $CH_3$ | $CH_3$ | $CH_3$ | O | O | 113 | White spirit. |
| (93) | 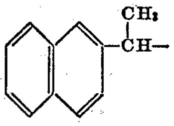 | $CH_3$ | H | $CH_3$ | O | O | 184-185 | Butanol. |
| (94) | 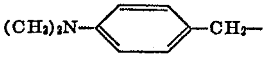 | $CH_3$ | H | $CH_3$ | O | O | 212 | Do. |
| (95) | Same as above | $CH_3$ | $CH_3$ | $CH_3$ | O | O | 100 | Ethanol. |
| (96) | 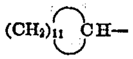 cyclododecyl | $CH_3$ | H | $CH_3$ | O | O | 207-209 | Butanol. |
| (97) | Same as above | $CH_3$ | $CH_3$ | $CH_3$ | O | O | 107-108 | White spirit. |
| (98) | 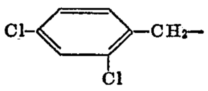 | $CH_3$ | H | $CH_3$ | O | O | 214-215 | Butanol. |
| (99) | Same as above | $CH_3$ | $CH_3$ | $CH_3$ | O | O | 117-119 | White spirit. |
| (100) | 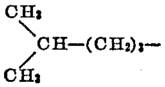 | $CH_3$ | H | $CH_3$ | O | O | 112 | Do. |
| (101) |  | $CH_3$ | H | $CH_3$ | O | O | 194 | Butanol. |
| (102) | Same as above | $CH_3$ | $CH_3$ | $CH_3$ | O | O | 104 | White spirit. |

TABLE 3—Continued

| No. | R | R' | R'' | R''' | X | Y | M.P. (° C.) | Recrystallized from— |
|---|---|---|---|---|---|---|---|---|
| (103) |  | $CH_3$ | H | $CH_3$ | O | O | 205 | Butanol. |
| (104) | Same as above | $CH_3$ | $CH_3$ | $CH_3$ | O | O | 91 | White spirit. |
| (105) | $(CH_3)_2CH-$ | $-CH_3$ | H | $-CH_3$ | S | O | 184–185 | |
| (106) | 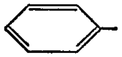 | $-CH_3$ | $-CH_3$ | $-CH_3$ | O | S | 87 | |
| (107) | 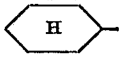 | $-CH_3$ | H | $-CH_3$ | S | O | 189–190 | |
| (108) | $(CH_3)_2CH-$ | $CH_3$ | H | $CH_3$ | O | S | 190–191 | |
| (109) | $(CH_3)_2CH-$ | $CH_3$ | H | $C_2H_5$ | O | S | 145–146 | |
| (110) | $(CH_3)_2CH-$ | $CH_3$ | H | $C_4H_9$ | O | S | 106–107 | |
| (111) | $(CH_3)_2CH-$ | $CH_3$ | H | $CH_2-CH=CH_2$ | O | S | 131–132 | |
| (112) | $(CH_3)_2CH-$ | $CH_3$ | $CH_3$ | $CH_3$ | O | S | Oil | |
| (113) | $(CH_3)_2CH-$ | $CH_3$ | $C_2H_5$ | $C_2H_5$ | O | S | 45 | |
| (114) | $(CH_3)_2CH-$ | $C_6H_5$ | H | $CH_3$ | O | S | 150 | |
| (115) | $(CH_3)_2CH-$ | $C_6H_5$ | H | $CH_2-CH=CH_2$ | O | S | 108–109 | |
| (116) | $(CH_3)_2CH-$ | $C_6H_5$ | $CH_3$ | $CH_3$ | O | S | Oil | |
| (117) | $(CH_3)_2CH$<br>\|<br>$CH_2$ | $CH_3$ | H | $CH_3$ | O | S | 159–160 | |
| (118) | Same as above | $CH_3$ | H | $C_2H_5$ | O | S | 136 | |
| (119) | do | $CH_3$ | H | $CH_2-CH=CH_2$ | O | S | 120 | |
| (120) | do | $CH_3$ | $CH_3$ | $CH_3$ | O | S | Oil | |
| (121) | do | $CH_3$ | $C_2H_5$ | $C_2H_5$ | O | S | Oil | |
| (122) | 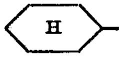 | $CH_3$ | H | $CH_3$ | O | S | 219–220 | |
| (123) | Same as above | $CH_3$ | $CH_3$ | $CH_3$ | O | S | 100–101 | |
| (124) |  | $CH_3$ | H | $CH_3$ | O | S | 178 | |
| (125) | Same as above | $CH_3$ | H | $C_2H_5$ | O | S | 139–140 | |
| (126) | do | $CH_3$ | H | $C_4H_9$ | O | S | 160–161 | |
| (127) | do | $CH_3$ | H | $CH_2-CH=CH_2$ | O | S | 141 | |
| (128) | do | $CH_3$ | $C_2H_5$ | $C_2H_5$ | O | S | Oil | |
| (129) | $(CH_3)_2CH-$ | $CH_3$ | H | $CH_2-CH-CH$ | S | O | 162 | |
| (130) | $(CH_3)_2CH-$ | $CH_3$ | $CH_3$ | $CH_3$ | S | O | 117 | |
| (131) | $(CH_3)_2CH-$ | $C_2H_5$ | H | $CH_3$ | S | O | 141–142 | |
| (132) | $(CH_3)_2CH-$ | $C_2H_5$ | $CH_3$ | $CH_3$ | S | O | 84–85 | |
| (133) | 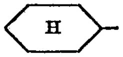 | $CH_3$ | H | $C_2H_5$ | S | O | 197–198 | |
| (134) | Same as above | $CH_3$ | H | $CH_2-CH=CH_2$ | S | O | 187–188 | |
| (135) | do | $CH_3$ | $CH_3$ | $CH_3$ | S | O | 130–131 | |
| (136) | $C_4H_9$ | H | H | $CH_3$ | S | O | 198 | |
| (137) | $(CH_3)_2CH-CH_2$ | H | H | $CH_3$ | S | O | 240–242 | |
| (138) |  | H | H | $CH_3$ | S | O | 262–264 | |
| (139) | 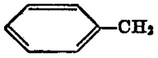 | H | H | $CH_3$ | S | O | 227–229 | |
| (140) | 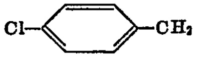 | H | H | $CH_3$ | S | O | 222–223 | |
| (141) | 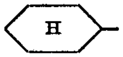 | H | H | $CH_3$ | S | O | 277 | |

It will be appreciated that the instant specification and examples are set forth by way of illustration and not limitation, and that various modifications and changes may be made without departing from the spirit and scope of the present invention.

What is claimed is:

1. 1,3,4 - thiadiazole - 5 - one-2-yl urea of the formula

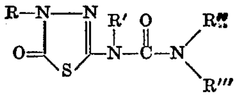

in which R is selected from the group consisting of hydrogen, alkyl of 1–13 carbon atoms, alkoxy-alkyl having 1–4 carbon atoms in the alkoxy moiety and 1–4 carbon atoms in the alkyl moiety, cycloalkyl of 3–12 ring carbon atoms, alkyl-cycloalkyl having 1–4 carbon atoms in the alkyl moiety and 5–6 ring carbon atoms in the cycloalkyl moiety, cyclohexenyl, tetrahydronaphthyl, fluorenyl, phenyl-alkyl having 1–4 carbon atoms in the alkyl moiety, naphthyl-alkyl having 1–4 carbon atoms in the alkyl moiety, diphenyl-methyl, triphenyl-methyl, chloro-substituted benzyl, alkyl-phenyl-alkyl having 1–4 carbon atoms in each corresponding alkyl moiety, alkoxy-benzyl having 1–4 carbon atoms in the alkoxy moiety, nitro-benzyl, cyano - benzyl, trifluoromethyl - benzyl, dialkyl-amino-benzyl having 1–4 carbon atoms in each alkyl moiety, phenyl, naphthyl, halo-substituted phenyl, alkyl-phenyl having 1–4 carbon atoms in the alkyl moiety, nitro-phenyl, cyano-phenyl, trifluoromethyl - phenyl, alkyl - chloro-phenyl having 1–4 carbon atoms in the alkyl moiety trifluoromethyl - chloro - phenyl, and furfuryl; R′ is selected from the group consisting of hydrogen, alkyl of 1–4 carbon atoms, alkenyl of 2–4 carbon atoms, and alkoxy-alkyl having 1–4 carbon atoms in the alkoxy moiety and 1–4 carbon atoms in the alkyl moiety; R″ is selected from the group consisting of hydrogen, alkyl of 1–3 carbon atoms, and alkenyl of 2–3 carbon atoms; and R‴ is selected from the group consisting of alkyl, alkenyl and alkynyl of up to 4 carbon atoms, and alkoxy of 1–4 carbon atoms.

2. Compound according to claim 1 wherein R is selected from the group consisting of hydrogen, $C_{1-8}$ alkyl, $C_{1-4}$ alkoxy, $C_{1-2}$ alkyl, $C_{5-12}$ cycloalkyl, $C_{1-2}$ alkyl-$C_{5-6}$ cycloalkyl, tri-($C_{1-2}$ alkyl)-cyclohexenyl, tetrahydronaphthyl, fluorenyl, phenyl-$C_{1-3}$ alkyl, naphthyl-$C_{1-2}$ alkyl, diphenyl-methyl, triphenyl-methyl, mono- to trichloro-substituted benzyl, $C_{1-4}$ alkyl - phenyl - $C_{1-2}$ alkyl, $C_{1-2}$ alkoxy - benzyl, nitro - benzyl, cyano-benzyl, trifluoromethyl - benzyl, di-($C_{1-2}$ alkyl)-amino-benzyl, phenyl, naphthyl, chloro - phenyl, dichloro - phenyl, bromophenyl, iodo - phenyl, fluoro - phenyl, $C_{1-2}$ alkyl-phenyl, nitro - phenyl, cyano - phenyl, trifluoromethyl - phenyl, ($C_{1-2}$ alkyl)-(chloro)-phenyl, (trifluoromethyl)-(chloro)-phenyl, and furfuryl; R′ is selected from the group consisting of hydrogen, $C_{1-4}$ alkyl, $C_{2-4}$ alkenyl, and $C_{1-4}$ alkoxy-$C_{1-3}$ alkyl; R″ is selected from the group consisting of hydrogen, $C_{1-2}$ alkyl, and $C_{2-4}$ alkenyl, and R‴ is selected from the group consisting of $C_{1-4}$ alkyl, $C_{2-4}$ alkenyl, $C_{2-4}$ alkynyl, and $C_{1-2}$ alkoxy.

3. Compound according to claim 1 wherein R is selected from the group consisting of $C_{1-8}$ alkyl, $C_{5-6}$ cycloalkyl, $C_{1-2}$ alkyl-$C_{5-6}$ cycloalkyl, tetrahydronaphthyl, phenyl-$C_{1-3}$ alkyl, naphthyl-$C_{1-2}$ alkyl, diphenyl-methyl, chloro-benzyl, dichloro-benzyl, $C_{1-4}$ alkyl-phenyl-$C_{1-2}$ alkyl, $C_{1-2}$ alkoxy-benzyl, di-($C_{1-2}$ alkyl)-amino-benzyl, phenyl, chloro-phenyl, dichloro-phenyl, $C_{1-2}$ alkyl-phenyl, nitro-phenyl, trifluoromethyl-phenyl, ($C_{1-2}$ alkyl)-(chloro)-phenyl, (trifluoromethyl)-(chloro)-phenyl, and furfuryl, R′ is selected from the group consisting of $C_{1-4}$ alkyl, $C_{2-4}$ alkenyl, and $C_{1-4}$ alkoxy-$C_{1-3}$ alkyl, R″ is selected from the group consisting of hydrogen, $C_{1-2}$ alkyl, and $C_{2-4}$ alkenyl, and R‴ is selected from the group consisting of $C_{1-4}$ alkyl and $C_{2-4}$ alkenyl.

4. Compound according to claim 1 wherein R is selected from the group consisting of $C_{1-4}$ alkyl, $C_{5-6}$ cycloalkyl, phenyl, chloro-phenyl, $C_{1-2}$ alkyl-phenyl, and (trifluoromethyl)-(chloro)-phenyl, R′ is $C_{1-4}$ alkyl, R″ is selected from the group consisting of hydrogen and $C_{1-4}$ alkyl, and R‴ is selected from the group consisting of $C_{1-4}$ alkyl and $C_{2-4}$ alkenyl.

5. Compound according to claim 1 wherein R is selected from the group consisting of $C_{1-4}$ alkyl, cyclohexyl, phenyl, 2- and 4- chlorophenyl, 4-($C_{1-2}$ alkyl)-phenyl, and 4-trifluoromethyl-2-chloro-phenyl, R′ is $C_{1-2}$ alkyl, R″ is selected from the group consisting of hydrogen and $C_{1-2}$ alkyl, and R‴ is selected from the group consisting of $C_{1-2}$ alkyl and allyl.

References Cited

UNITED STATES PATENTS

| | | | |
|---|---|---|---|
| 3,121,089 | 2/1964 | Jönsson | 260—306.8 |
| 3,454,591 | 7/1969 | Schulz et al. | 260—306.8 A |
| 3,551,442 | 12/1970 | Guillot et al. | 260—306.8 R |

RICHARD J. GALLAGHER, Primary Examiner

U.S. Cl. X.R.

71—90

UNITED STATES PATENT OFFICE
CERTIFICATE OF CORRECTION

Patent No. 3,801,589 Dated April 2, 1974

Inventor(s) KLAUS SASSE ET AL. (Page 1 of 2)

It is certified that error appears in the above-identified patent and that said Letters Patent are hereby corrected as shown below:

Col. 3, line 60, change "$C_{1-14}$" to -- $C_{1-4}$ --.

Col. 4, line 9, insert " , " (comma) between "methyl" and "ethy

Col. 8, line 59, correct formula to read as follows:

-- 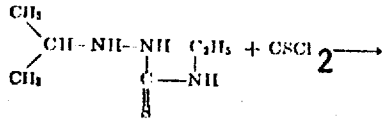 --

Col.10, line 29, Compound (62), cancel " 1-[4"-chloro" and substitute therefor -- 1-[4'-(4"-chloro --.

Col. 11, line 60, Compound 222, change "3-zthyl" to -- 3-methy

Col. 11, line 66, Compound 227, change"q-methyl" to -- 1-methy

Col. 11, line 70, Compound 230, correct spelling of "thiadiazol

Col. 21, line 74, change "407" to -- 40% --.

Col. 22, Example 7, Compound (139), correct formula to read as follows:

-- 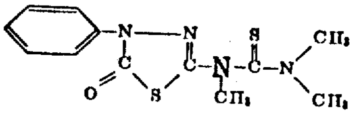 --.

(5/69)

UNITED STATES PATENT OFFICE

CERTIFICATE OF CORRECTION

Patent No. 3,801,589 Dated

Inventor(s) (Page 2 of 2)

It is certified that error appears in the above-identified paten and that said Letters Patent are hereby corrected as shown below:

Cols. 23, 24 - Table 3, Compound (17), under heading "M.P. (' change "72-7" to -- 72-74 --.

Cols. 31, 32, Table 3, Compounds (114) (115) (116) cancel

"$C^{2}H_5$" and substitute therefor -- $C_2H_5$ --;

Compound (129) under heading " R''' ", change

"$CH_2$-CH-CH " to -- $CH_2$-CH=CH --.

Signed and sealed this 7th day of January 1975.

(SEAL)
Attest:

McCOY M. GIBSON JR.
Attesting Officer

C. MARSHALL DANN
Commissioner of Patents